(12) United States Patent
Yamada

(10) Patent No.: US 10,628,090 B2
(45) Date of Patent: Apr. 21, 2020

(54) COMPUTER-READABLE MEDIUM, INFORMATION PROCESSING DEVICE, AND METHOD FOR CAUSING A PRINTER TO PERFORM PRE-PRINTING OPERATION

(71) Applicant: BROTHER KOGYO KABUSHIKI KAISHA, Nagoya-shi, Aichi (JP)

(72) Inventor: Kazutaka Yamada, Nagakute (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 16/221,689

(22) Filed: Dec. 17, 2018

(65) Prior Publication Data

US 2019/0196751 A1 Jun. 27, 2019

(30) Foreign Application Priority Data

Dec. 27, 2017 (JP) .................. 2017-251537
May 25, 2018 (JP) .................. 2018-100160

(51) Int. Cl.
*G06F 3/12* (2006.01)

(52) U.S. Cl.
CPC .......... *G06F 3/1203* (2013.01); *G06F 3/1213* (2013.01); *G06F 3/1236* (2013.01); *G06F 3/1259* (2013.01); *G06F 3/1285* (2013.01); *G06F 3/1287* (2013.01); *G06F 3/1296* (2013.01)

(58) Field of Classification Search
CPC combination set(s) only.
See application file for complete search history.

(56) References Cited

U.S. PATENT DOCUMENTS

| 6,268,925 | B1 | 7/2001 | Yamanaka |
| 2004/0184081 | A1* | 9/2004 | Yamamoto ............ G06F 3/1212 358/1.15 |
| 2017/0223210 | A1 | 8/2017 | Yamada |

FOREIGN PATENT DOCUMENTS

| JP | H11-5350 A | 1/1999 |
| JP | 2017-047590 A | 3/2017 |
| JP | 2017-134718 A | 8/2017 |

* cited by examiner

*Primary Examiner* — Helen Zong
(74) *Attorney, Agent, or Firm* — Scully, Scott, Murphy & Presser, PC

(57) ABSTRACT

A non-transitory computer-readable medium stores computer-readable instructions that are executable by a processor of an information processing device including a communication interface. The instructions are configured to, when executed by the processor, cause the information processing device to, in response to receiving print instruction information, determine whether to transmit preparing instruction information to cause a printer to perform a pre-printing operation, based on at least one of information included in the received print instruction information and reference communication time required for communication with the printer, the pre-printing operation including preparing for a printing operation in advance of performing the printing operation, the preparing instruction information being information to be transmitted prior to instructing the printer to perform the printing operation.

11 Claims, 12 Drawing Sheets

| JOB ID | INSTRUCTION INFORMATION | 67A |
|---|---|---|
| CONTENT DATA A | CONVEYING INSTRUCTION INFORMATION | ↓ TRANSMISSION ORDER |
| | INK-DISCHARGING INSTRUCTION INFORMATION | |
| | SHEET-DISCHARGING INSTRUCTION INFORMATION | |
| CONTENT DATA B | FEEDING INSTRUCTION INFORMATION | |
| | CUEING INSTRUCTION INFORMATION | |

FIG. 3A

| JOB ID | INSTRUCTION INFORMATION | 67A |
|---|---|---|
| _PREPARATION_ | PREPARING INSTRUCTION INFORMATION | |

FIG. 3B

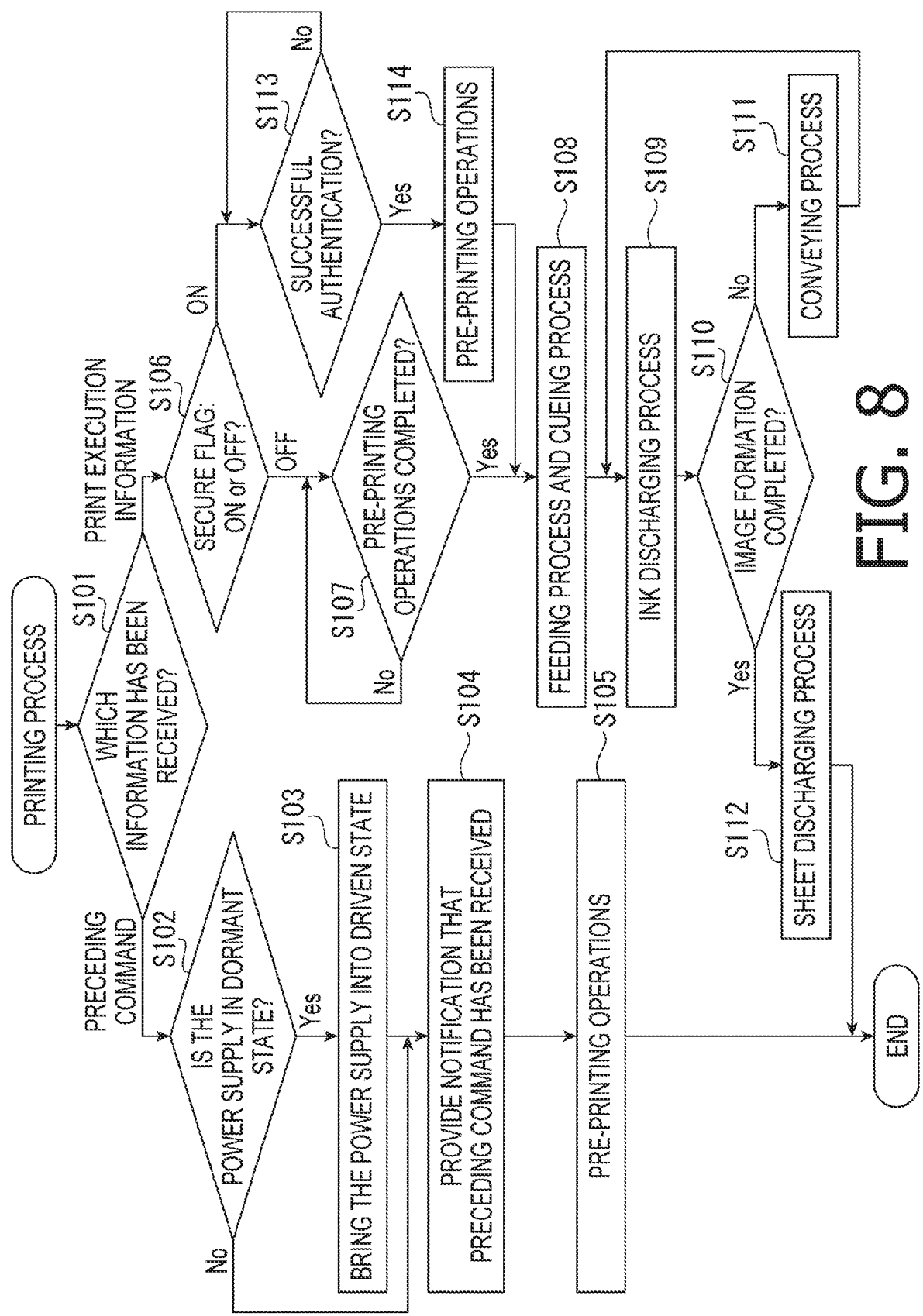

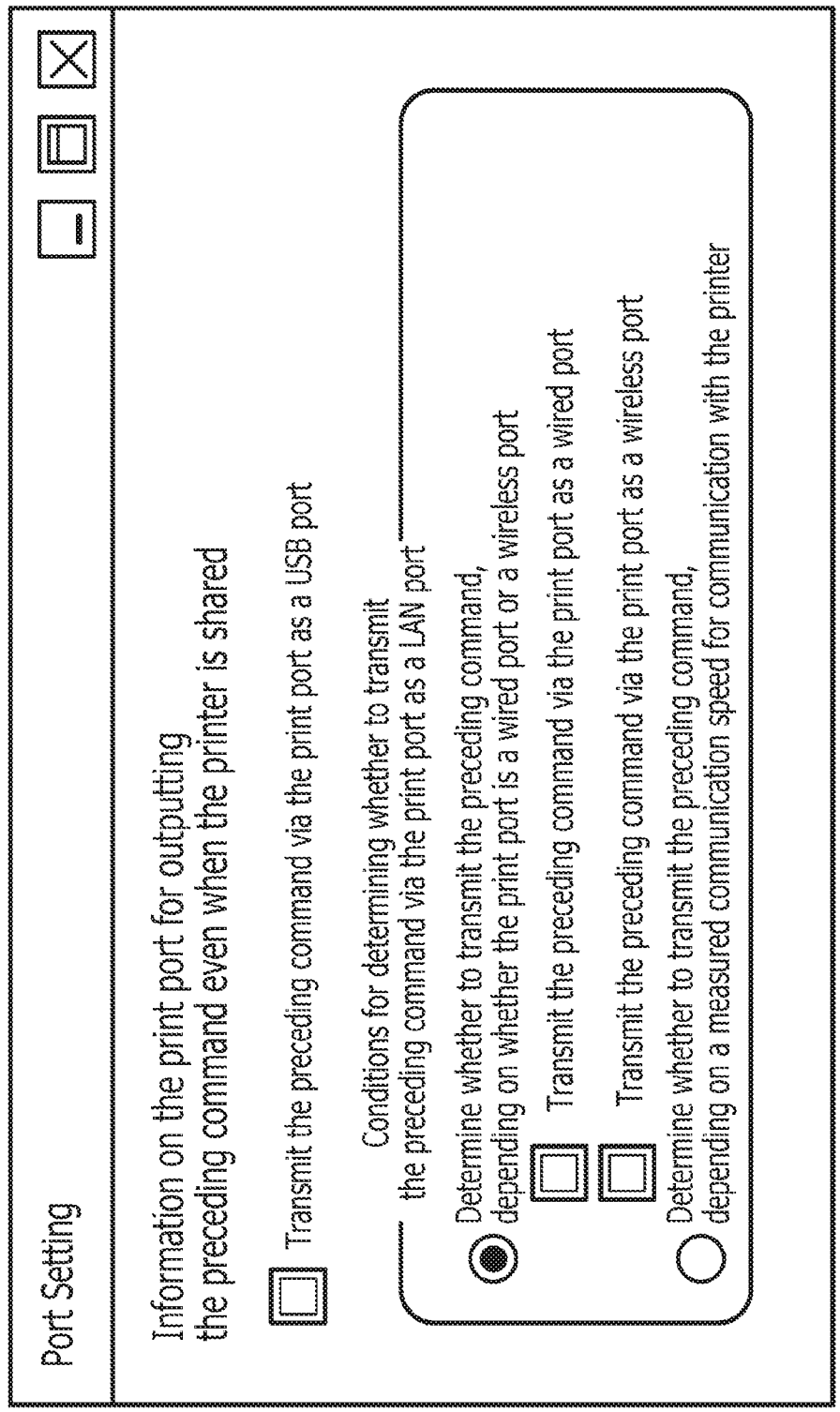

COMPUTER-READABLE MEDIUM, INFORMATION PROCESSING DEVICE, AND METHOD FOR CAUSING A PRINTER TO PERFORM PRE-PRINTING OPERATION

CROSS-REFERENCE TO RELATED APPLICATION

This application claims priority under 35 U.S.C. § 119 from Japanese Patent Applications No. 2017-251537 filed on Dec. 27, 2017 and No. 2018-100160 filed on May 25, 2018. The entire subject matter of the applications is incorporated herein by reference.

BACKGROUND

Technical Field

Aspects of the present disclosure are related to a non-transitory computer-readable medium, an information processing device, and a method for causing a printer to perform a pre-printing operation.

Related Art

Heretofore, a computer program has been known that is configured to, when executed by a processor, cause the processor to transmit, to a printer connected with the processor via a communication network, an instruction to perform a pre-printing operation to secure a particular level of print quality in a printing operation, prior to transmitting to the printer an instruction to perform the printing operation. For instance, the known program, as launched by an OS ("OS" is an abbreviation of "operating system") for the processor, may cause the processor to transmit to the printer an automatic wake-up command instructing the printer to perform the pre-printing operation, in response to determining that an output port of the printer is in a ready state and that an elapsed time since the latest data transmission to the printer is equal to or longer than a particular period of time.

Further, so far, a system has been known that is configured to cause an information management server to manage the number of sheets printed by a printer and charge a service fee depending on the number of the printed sheets.

SUMMARY

Aspects of the present disclosure are advantageous to provide one or more improved techniques for appropriately determining whether to cause a printer to perform a pre-printing operation.

According to aspects of the present disclosure, a non-transitory computer-readable medium is provided, which stores computer-readable instructions that are executable by a processor of an information processing device including a communication interface. The instructions are configured to, when executed by the processor, cause the information processing device to receive print instruction information from an OS for the processor, the print instruction information including a print instruction, the print instruction representing that a user instruction to cause a printer to perform a printing operation has been input, in response to receiving the print instruction information, determine whether to transmit preparing instruction information to cause the printer to perform a pre-printing operation, based on at least one of information included in the received print instruction information and reference communication time required for communication with the printer, the pre-printing operation including preparing for the printing operation in advance of performing the printing operation, the preparing instruction information being information to be transmitted prior to instructing the printer to perform the printing operation, in response to determining to transmit the preparing instruction information, transmit the preparing instruction information to the printer via the communication interface, in response to transmitting the preparing instruction information, generate print data based on user-designated content data, and transmit print execution information to the printer via the communication interface, the print execution information instructing the printer to perform the printing operation based on the generated print data.

According to aspects of the present disclosure, further provided is an information processing device including a communication interface, and a controller configured to perform a control process including receiving print instruction information from an OS for the controller, the print instruction information including a print instruction, the print instruction representing that a user instruction to cause a printer to perform a printing operation has been input, in response to receiving the print instruction information, determining whether to transmit preparing instruction information to cause the printer to perform a pre-printing operation, based on at least one of information included in the received print instruction information and reference communication time required for communication with the printer, the pre-printing operation including preparing for the printing operation in advance of performing the printing operation, the preparing instruction information being information to be transmitted prior to instructing the printer to perform the printing operation, in response to determining to transmit the preparing instruction information, transmitting the preparing instruction information to the printer via the communication interface, in response to transmitting the preparing instruction information, generating print data based on user-designated content data, and transmitting print execution information to the printer via the communication interface, the print execution information instructing the printer to perform the printing operation based on the generated print data.

According to aspects of the present disclosure, further provided is a method implementable on a processor of an information processing device including a communication interface. The method includes receiving print instruction information from an OS for the processor, the print instruction information including a print instruction, the print instruction representing that a user instruction to cause a printer to perform a printing operation has been input, in response to receiving the print instruction information, determining whether to transmit preparing instruction information to cause the printer to perform a pre-printing operation, based on at least one of information included in the received print instruction information and reference communication time required for communication with the printer, the pre-printing operation including preparing for the printing operation in advance of performing the printing operation, the preparing instruction information being information to be transmitted prior to instructing the printer to perform the printing operation, in response to determining to transmit the preparing instruction information, transmitting the preparing instruction information to the printer via the communication interface, in response to transmitting the preparing instruction information, generating print data based on user-designated content data, and transmitting print execution information to the printer via the communication interface, the print execution information instructing the printer to perform the printing operation based on the generated print data.

BRIEF DESCRIPTION OF THE ACCOMPANYING DRAWINGS

FIGS. 1A, 1B, and 1C show methods for connecting one or more PCs with one or more printers in an illustrative embodiment according to one or more aspects of the present disclosure.

FIG. 3A exemplifies print instruction information stored in a queue area of a memory of the PC in the illustrative embodiment according to one or more aspects of the present disclosure.

FIG. 3B exemplifies a preceding command stored in the queue area in the illustrative embodiment according to one or more aspects of the present disclosure.

Figure 4:
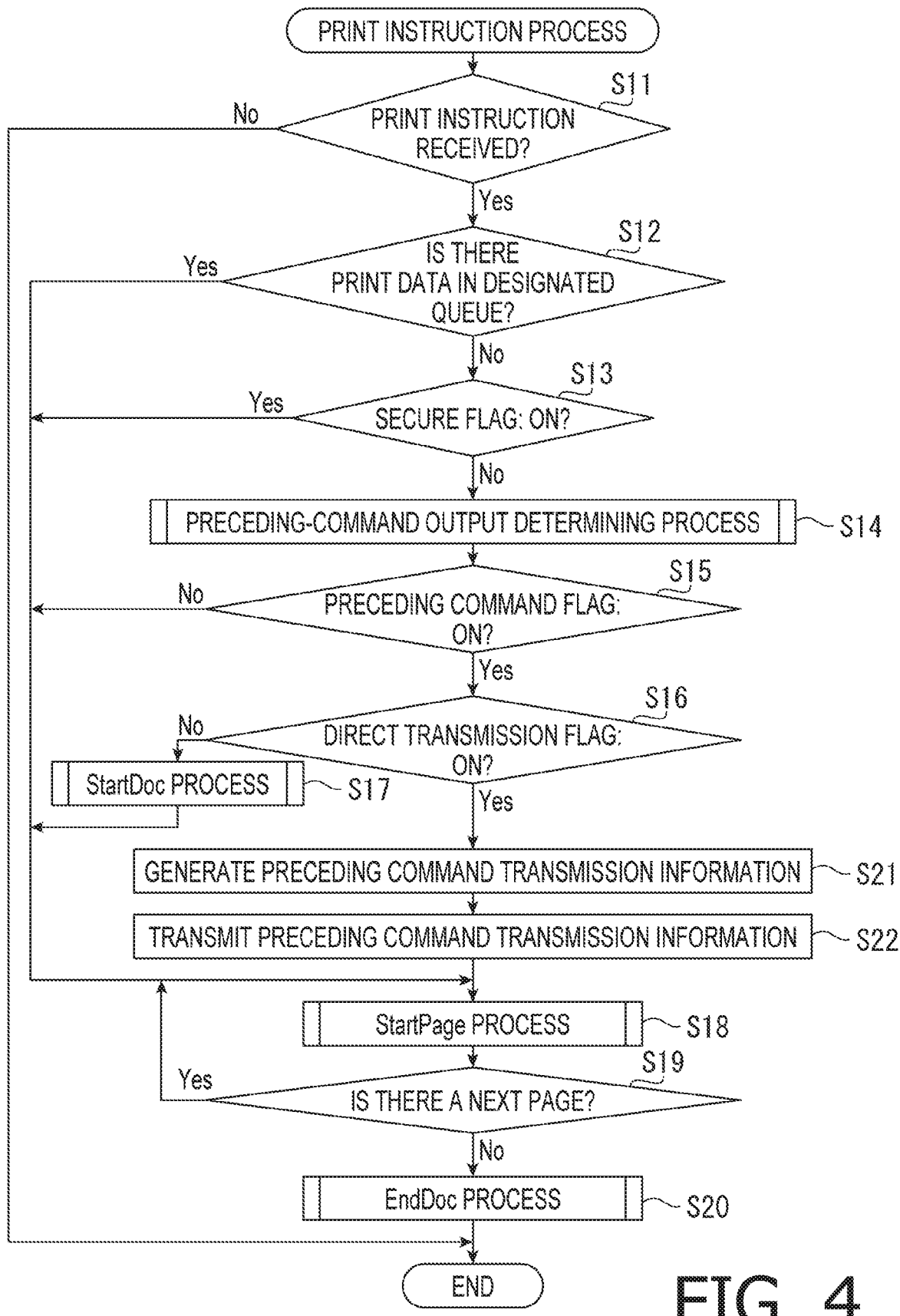

FIG. 4 is a flowchart showing a procedure of a print instruction process in the illustrative embodiment according to one or more aspects of the present disclosure.

Figure 5A:
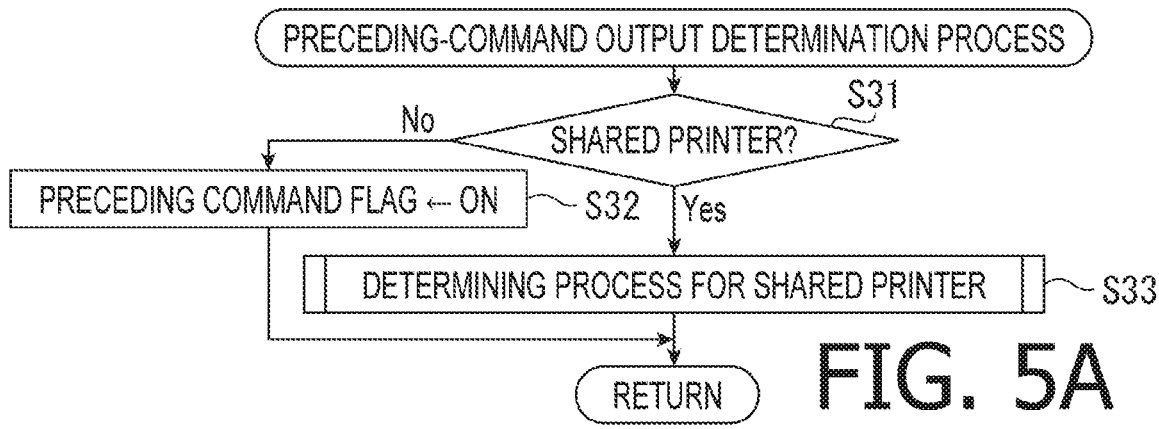

FIG. 5A is a flowchart showing a procedure of a preceding-command output determination process in the illustrative embodiment according to one or more aspects of the present disclosure.

Figure 5B:
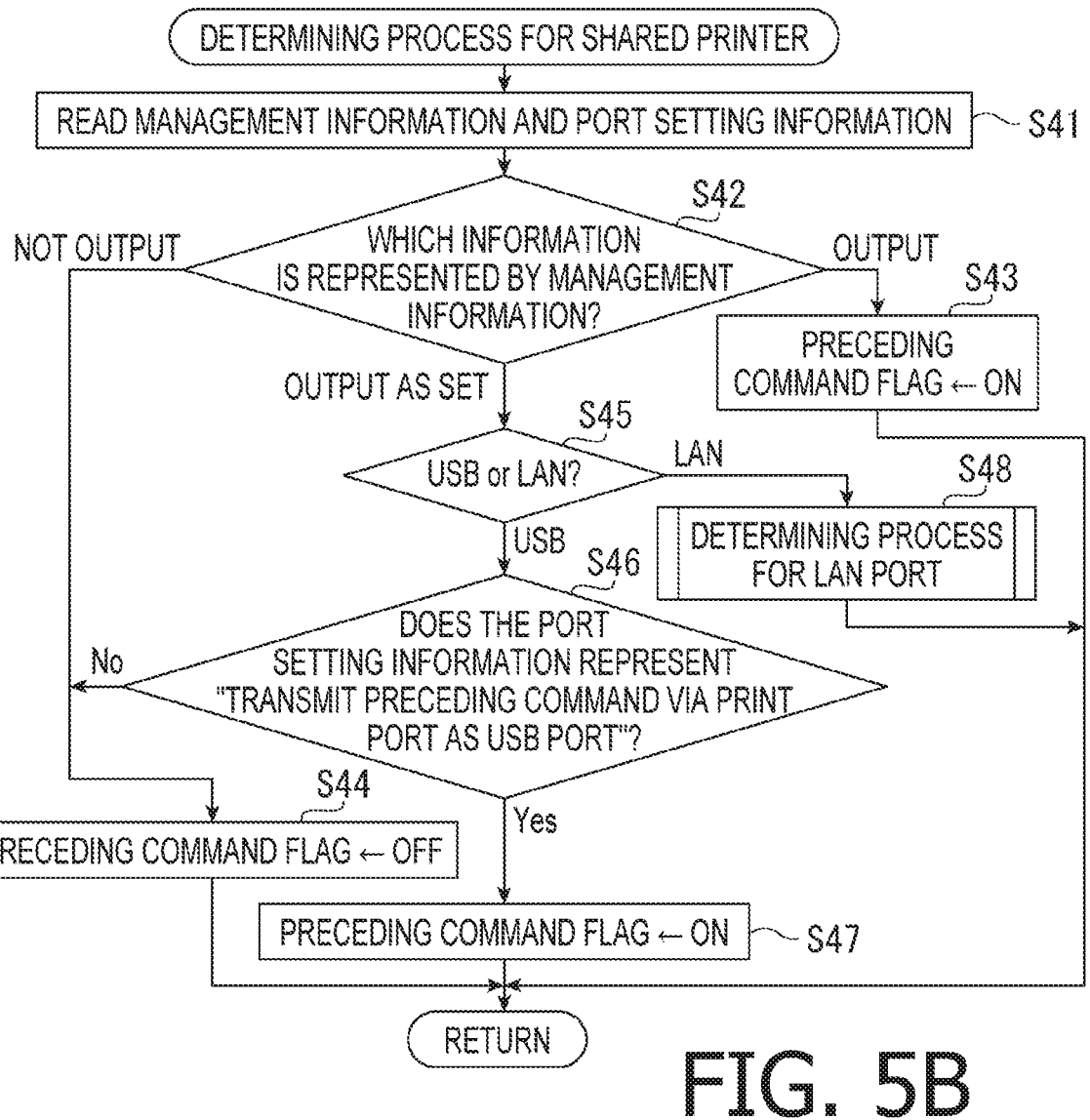

FIG. 5B is a flowchart showing a procedure of a determining process for shared printer in the illustrative embodiment according to one or more aspects of the present disclosure.

Figure 6:
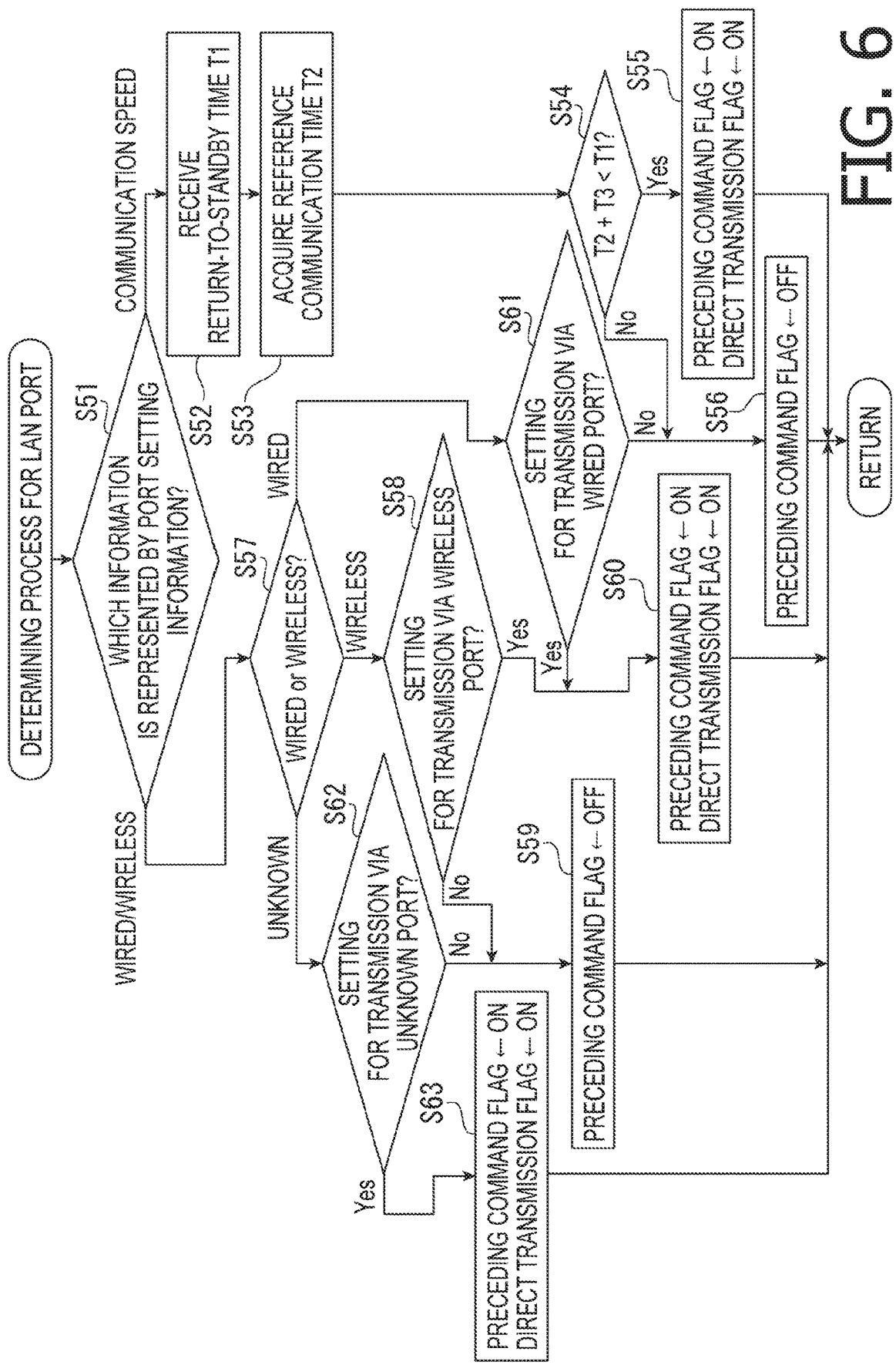

FIG. 6 is a flowchart showing a procedure of a determining process for LAN port in the illustrative embodiment according to one or more aspects of the present disclosure.

Figure 7A:
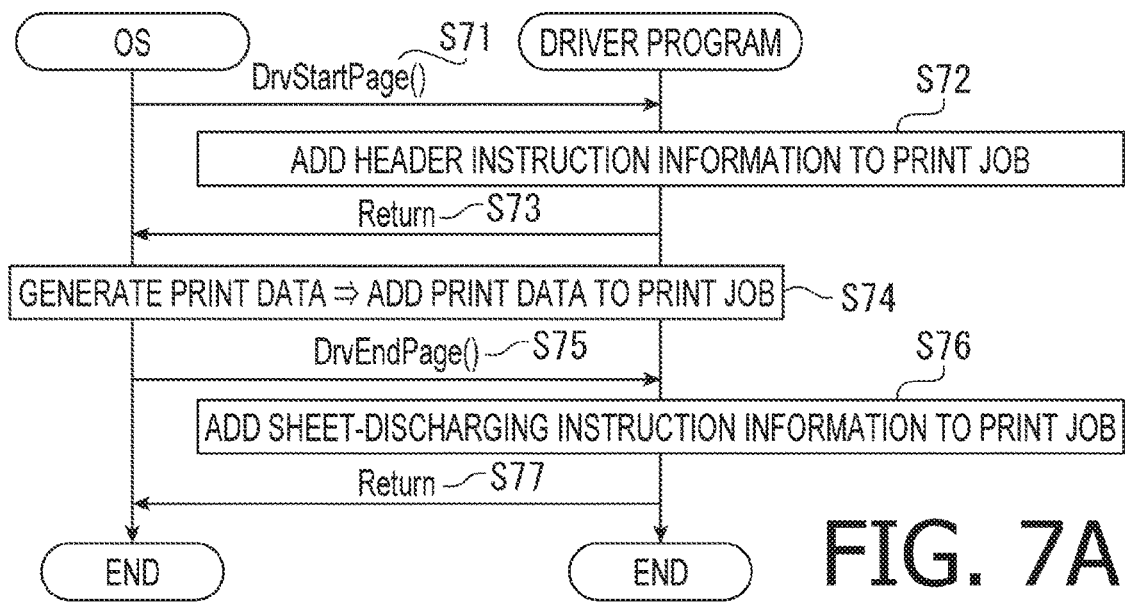

FIG. 7A is a flowchart showing a procedure of a StartPage process in the illustrative embodiment according to one or more aspects of the present disclosure.

Figure 7B:
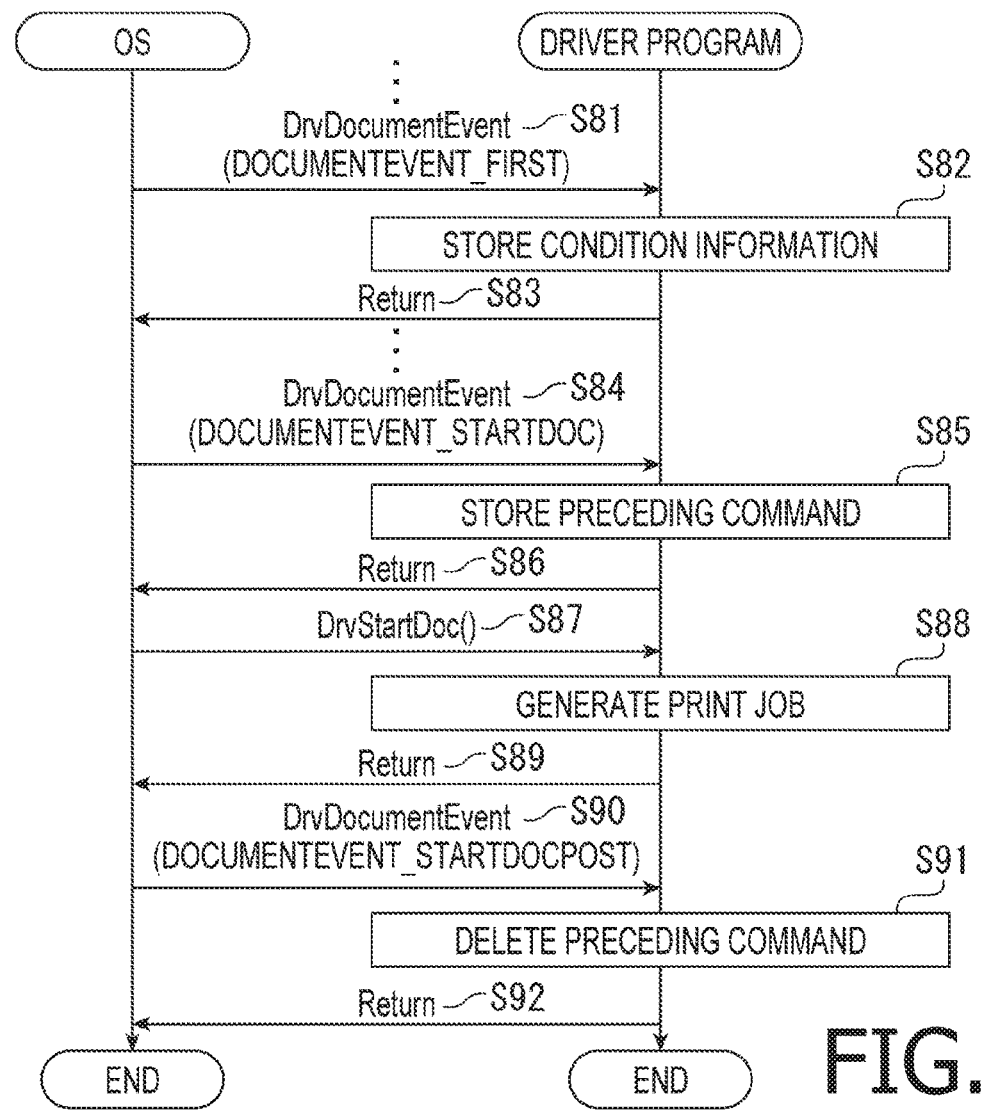

FIG. 7B is a flowchart showing a procedure of a StartDoc process in the illustrative embodiment according to one or more aspects of the present disclosure.

FIG. 8 is a flowchart showing a procedure of a printing process in the illustrative embodiment according to one or more aspects of the present disclosure.

FIG. 9 shows a port setting information input screen in the illustrative embodiment according to one or more aspects of the present disclosure.

Figure 10:
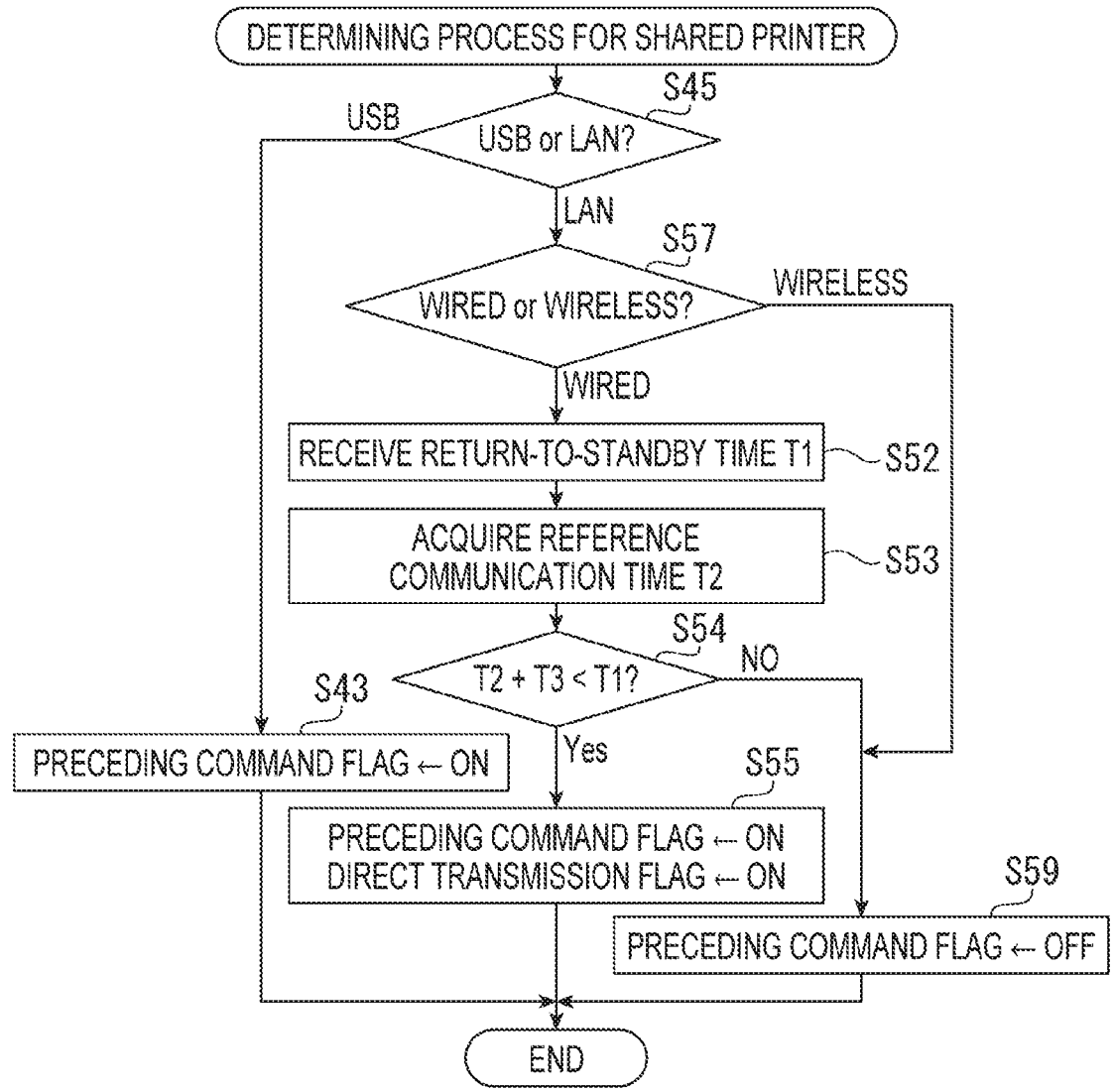

FIG. 10 is a flowchart showing a procedure of a determining process for shared printer in a first modification according to one or more aspects of the present disclosure.

Figure 11A:
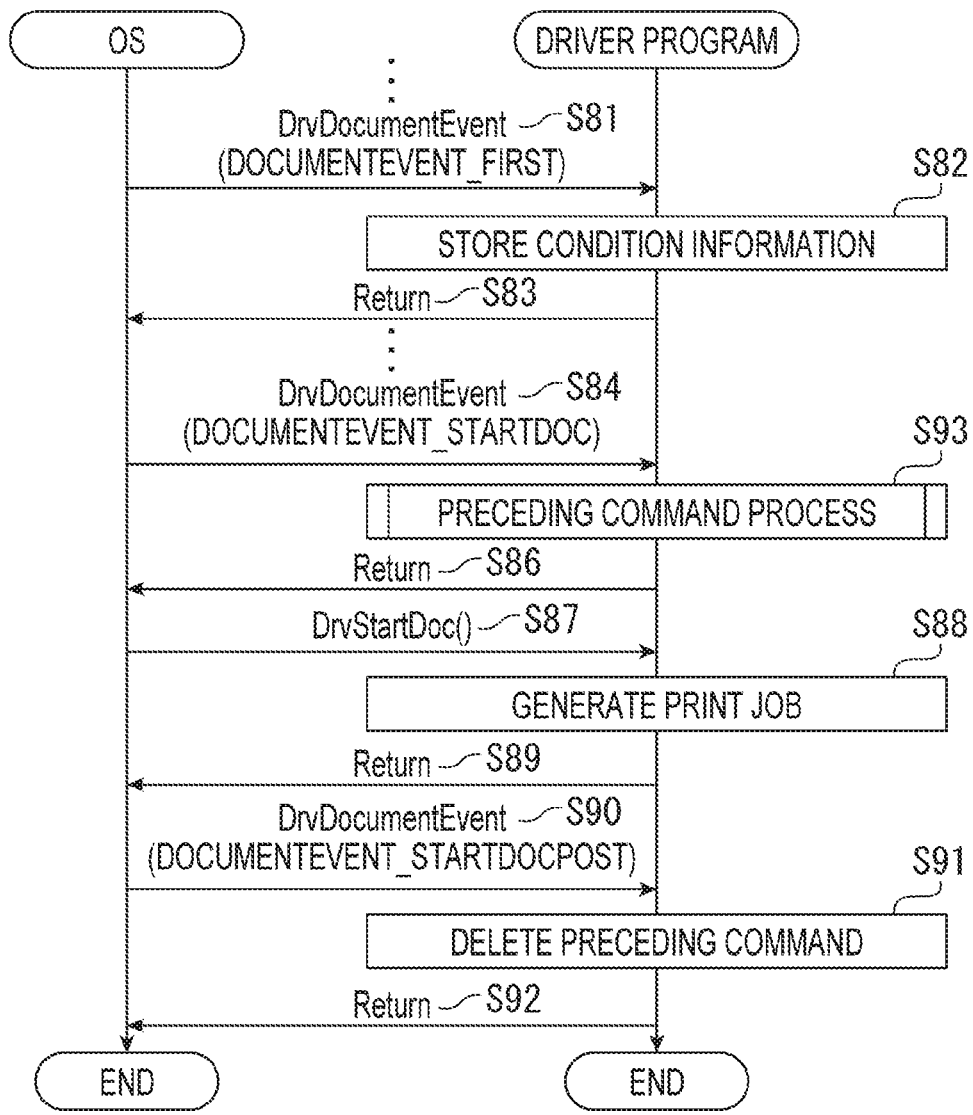

FIG. 11A is a flowchart showing a procedure of a StartDoc process in a second modification according to one or more aspects of the present disclosure.

Figure 11B:
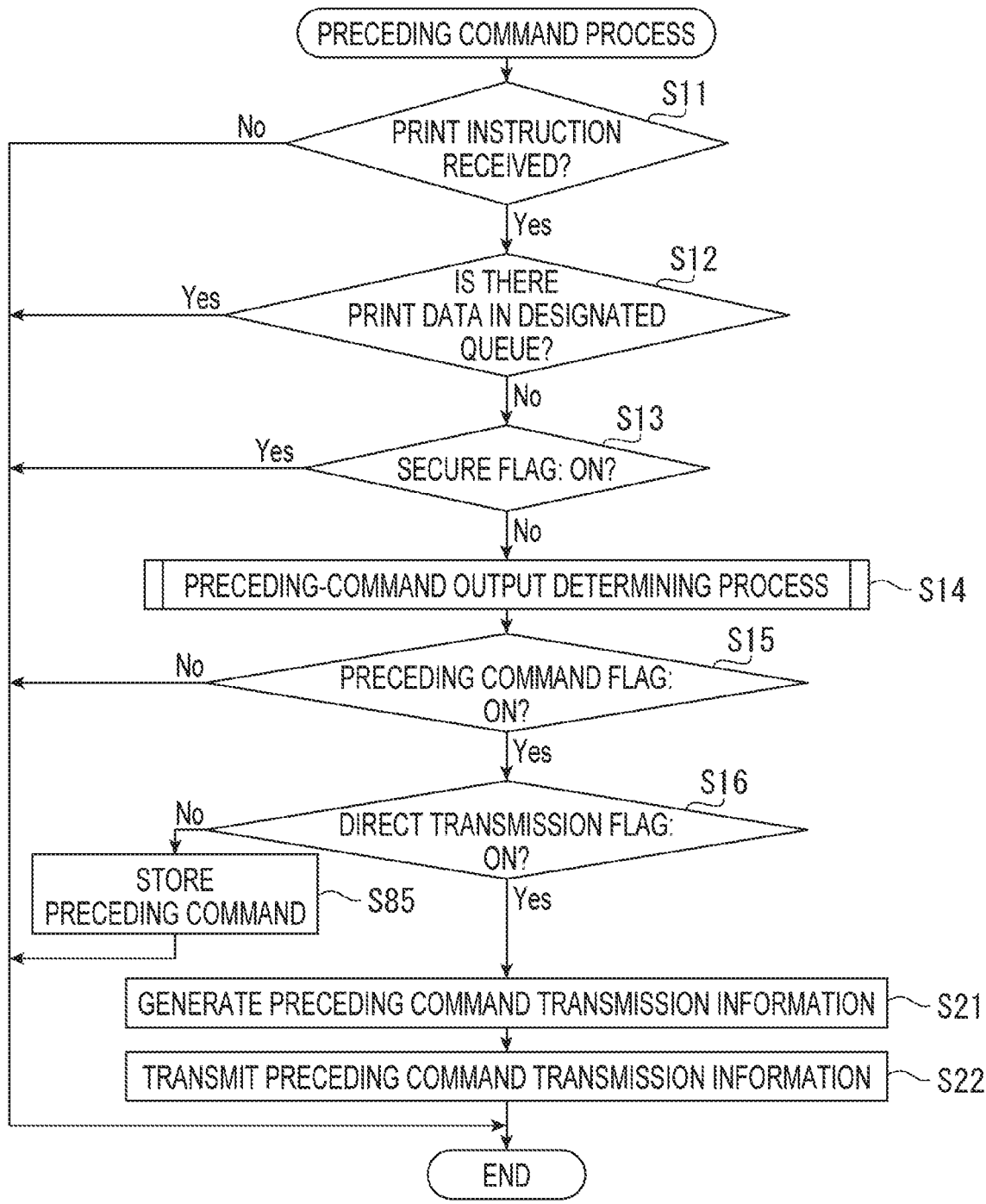

FIG. 11B is a flowchart showing a procedure of a preceding command process in the second modification according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

In the illustrative embodiment, a driver program 66 (see FIG. 2B) will be described. The driver program 66 is installed in a personal computer (hereinafter referred to as a "PC") 50, and is executable by a CPU 61 of the PC 50.

Figure 1A:
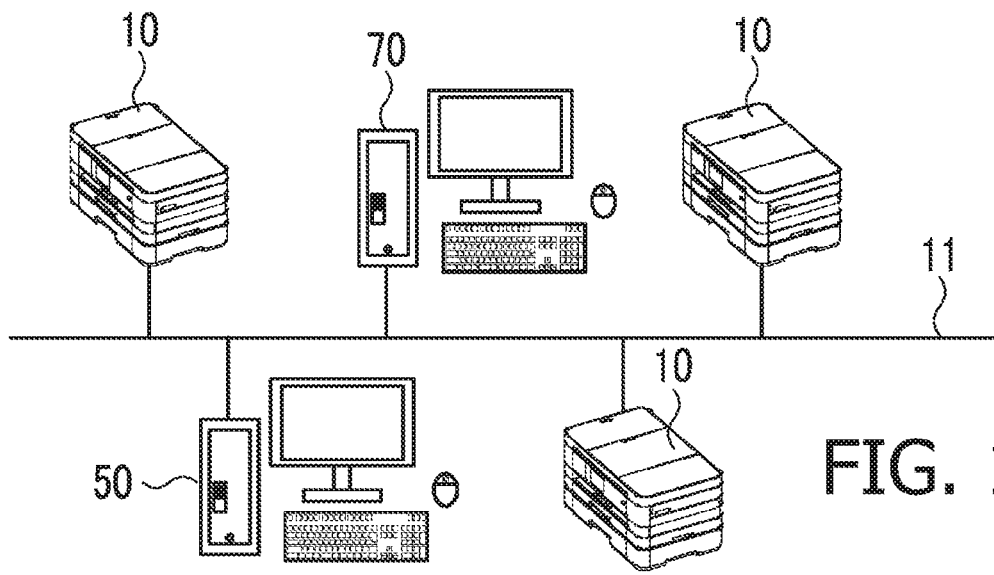

The PC 50, having the driver program 66 installed therein, is configured to communicate with one or more printers 10 in various methods. Specifically, as exemplified in FIG. 1A, a PC 50 and a PC 70 are connected with a network 11. The PC 70 is communicable with the printers 10 via the network 11. The PC 70 is configured with a setting "printer sharing" to use the printers 10 connected thereto in common with other devices and/or apparatuses via the network 11, thereby allowing the PC 50 to use the printers 10. Thus, the PC 70 may function as a server. Hereinafter, the printers 10 managed by the PC 70 may be referred to as the "shared printers 10."

Figure 1B:
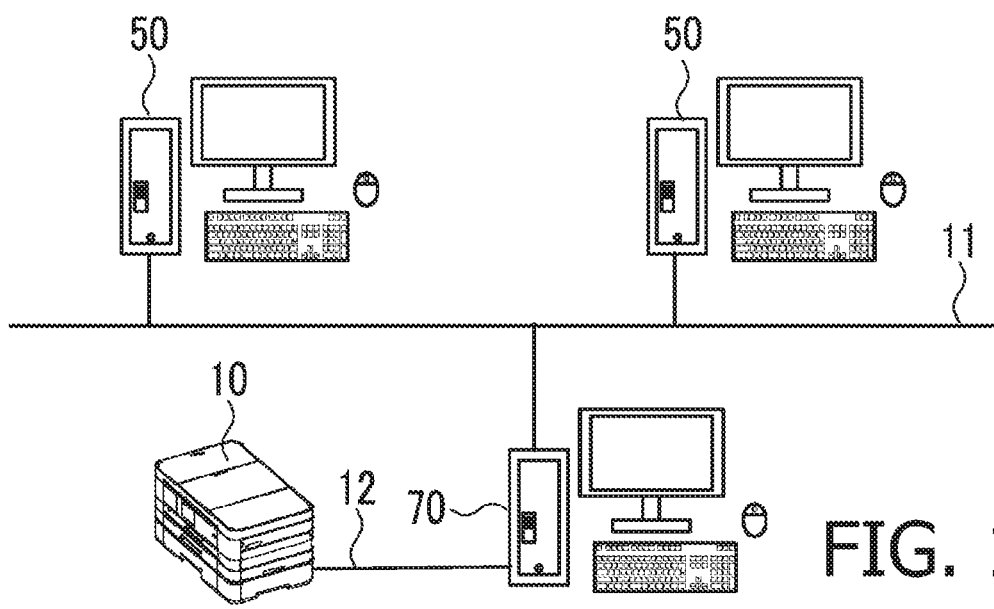

Further, as exemplified in FIG. 1B, PCs 50 are communicably connected, via a PC 70, with a printer 10 locally connected with the PC 70 via a cable 12. In this case, the PCs 50 are communicable with the printer 10 via the PC 70. In the same manner as exemplified in FIG. 1A, the PC 70 in FIG. 1B is configured with the setting "printer sharing," thereby allowing the PCs 50 to use the printer 10.

Figure 1C:
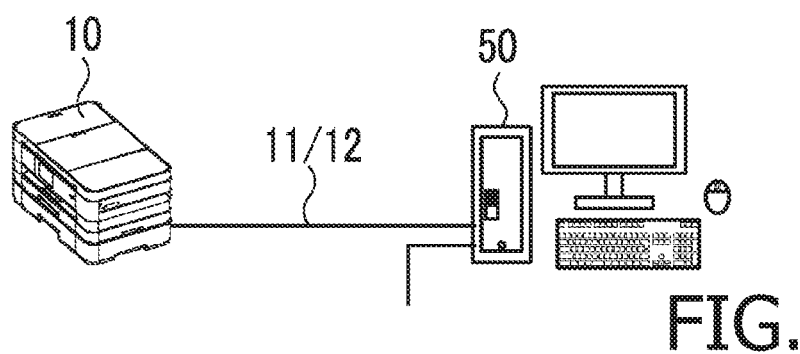

Further, as exemplified in FIG. 1C, a PC 50 is communicably connected with a printer 10 via a network 11 or a cable 12. The cable 12 may be, but not limited to, a USB cable or a parallel cable. The network 11 may be, but not limited to, a wired LAN or a wireless LAN. Further, the PC 50 may be connected with the network 11 via Wi-Fi (a registered trademark of Wi-Fi Alliance) communication through an access point (not shown).

The PC 70 has a management function to acquire information on the number of sheets printed by a printer 10 from a print job received from a PC 50 and calculate a service fee depending on the acquired number of printed sheets. For instance, a manufacturer of the printer 10 may manage the printer 10 via the PC 70. Namely, a user may be provided with the printer 10 managed by the manufacturer.

For instance, the manufacturer may provide the user with a set of the printer 10 and the driver program 66. Alternatively, the manufacturer may provide the user with a set of the printer 10, the driver program 66, and a program (not shown) installable into the PC 70. For instance, the driver program 66 may be provided in a form stored in a CD-ROM packed together with the printer 10, or may be downloaded from a specific Web site of the manufacturer.

In the illustrative embodiment, an explanation will be provided of the driver program 66 configured to appropriately transmit a below-mentioned preceding command to the printer 10 depending on how the PC 50 is connected with the printer 10 and on whether the PC 70 is involved in the connection between the PC 50 and the printer 10.

Figure 2A:
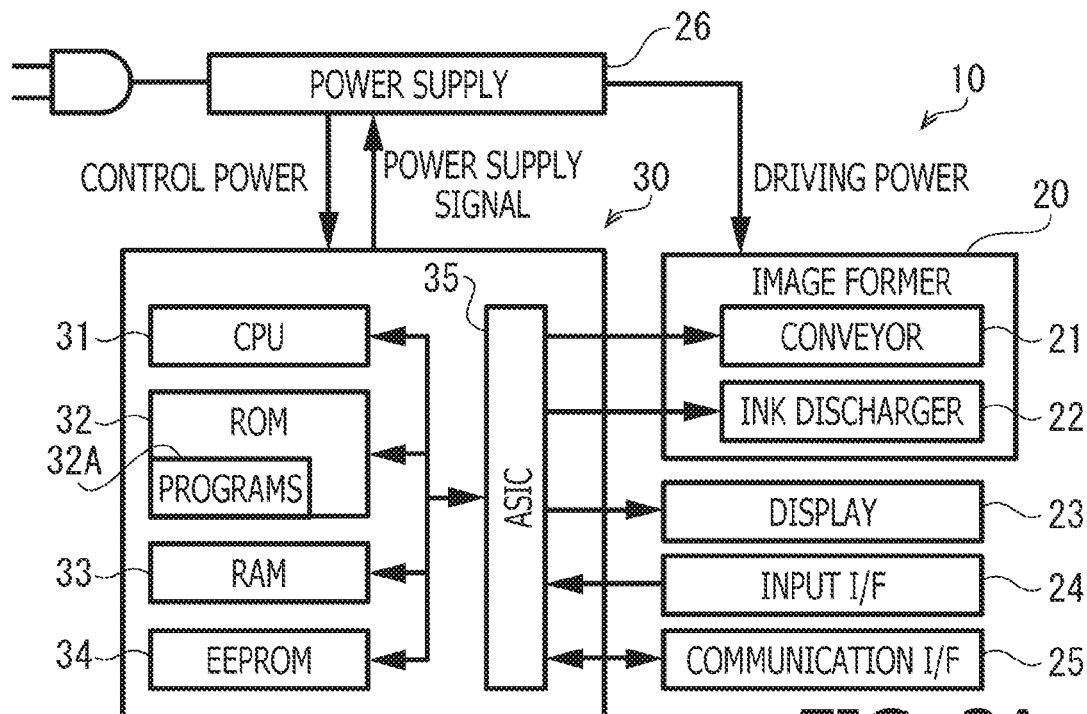
FIG. 2A is a functional block diagram showing an electrical configuration of the printer in the illustrative embodiment according to one or more aspects of the present disclosure.

As shown in FIG. 2A, the printer 10 includes a power supply 26, an image former 20, a display 23, an input I/F ("I/F" is an abbreviation of "interface") 24, a communication I/F 25, and a controller 30. The elements included in the printer 10 are interconnected via a communication bus (not shown). In the illustrative embodiment, the printer 10 is an inkjet printer. Nonetheless, the printer 10 is not limited to the inkjet printer but may be of another type such as an electrophotographic type.

The power supply 26 is configured to supply electric power supplied from an external power source via a power supply plug, to each element included in the printer 10. Specifically, the power supply 26 may output the electric power supplied from the external power source, as driving power (e.g., DC 24V) to the image former 20 and as control power (e.g., DC 5V) to the controller 30. Further, although the following features are not shown in any drawings, the power supply 26 may supply the electric power to the display 23, the input I/F 24, and the communication I/F 25. For instance, the power supply 26 includes an AC/DC converter for converting a commercial AC voltage into a DC voltage, and a DC/DC converter such as a switching regulator for stepping down the DC voltage output from the AC/DC converter to a particular DC voltage.

Further, the power supply 26 is switchable between a driven state and a dormant state, based on a driving signal output from the controller 30. More specifically, the controller 30 outputs a driving signal for driving switching elements of the AC/DC converter and the DC/DC converter, thereby bringing the power supply 26 currently in the dormant state into the driven state.

In the driven state, the power supply 26 outputs the driving power to the image former 20. In other words, when the power supply 26 is in the driven state, the image former 20 is allowed to operate. Meanwhile, in the dormant state, the power supply 26 does not output the driving power to the image former 20. In other words, when the power supply 26 is in the dormant state, the image former 20 is not allowed to operate. On the other hand, the power supply 26 outputs the control power, regardless of whether the power supply 26 is in the driven state or the dormant state. Further, although the following features are not shown in any drawings, the input I/F 24 is configured to output an operation signal in response to a user operation, regardless of whether the power supply 26 is in the driven state or the dormant state. Further, the communication I/F 25 is configured to receive information from external devices/apparatuses, regardless of whether the power supply 26 is in the driven state or the dormant state.

The image former 20 is configured to perform pre-printing operations and a printing operation in accordance with instructions from the controller 30. The printing operation is an operation of forming an image on a sheet. The pre-printing operations are performed in advance of the printing operation so as to secure a particular level of print quality in the printing operation. The printing operation and the pre-printing operations will be described later in detail. As shown in FIG. 2A, the image former 20 includes a conveyor 21 and an ink discharger 22.

The conveyor 21 is configured to convey a sheet placed on a feed tray (not shown) in a conveyance direction. For instance, the conveyor 21 may include a plurality of rollers rotatable by a driving force from a motor (not shown). The conveyor 21 is further configured to convey the sheet to a position where the sheet faces the ink discharger 22 and discharge the sheet with an image formed thereon by the ink discharger 22 out of the printer 10. The printer 10 may have a plurality of feed trays.

The ink discharger 22 is configured to move in a main scanning direction perpendicular to the conveyance direction, in a position where the ink discharger faces the sheet conveyed by the conveyor 21. Specifically, the ink discharger 22 may move in the main scanning direction in response to receiving the driving force from the motor (not shown). A lower surface of the ink discharger 22 includes a nozzle surface with a plurality of nozzles formed therein. Thus, the ink discharger 22 is further configured to discharge ink droplets from the nozzles.

When ink droplets, discharged from the nozzles of the ink discharger 22 while the ink discharger 22 is moving in the main scanning direction, land on the sheet, an image is formed on the sheet. Hereinafter, an area on the sheet within which the ink droplets discharged when the ink discharger 22 moves from one end to another in the main scanning direction are allowed to land may be referred to as a "printable area." The sheet is sectioned into a plurality of printable areas. Then, the ink discharger 22 sequentially forms an image in each of the printable areas in the below-mentioned printing operation.

The display 23 may be, but not limited to, a liquid crystal display or an organic electroluminescence display. The display 23 has a display surface configured to display thereon various kinds of information.

The input I/F 24 is a user interface for accepting user operations. Specifically, the input I/F 24 includes buttons and is configured to, when one or more buttons are operated by the user, transmit to a CPU 31 an operation signal corresponding to the operated button(s). Further, the input I/F 24 may include a membranous touch sensor formed on the display surface of the display 23. In the following description, "objects" may include but are not limited to character strings, icons, buttons, and links displayed on the display 23.

The touch sensor included in the input I/F 24 is configured to, when the user touches a position on the display surface of the display 23, output positional information indicating the touched position. In the following description, "touching" may include every operation of bringing an input medium in contact with or in proximity to the display surface of the display 23. Further, the input medium may be, but not limited to, a user's finger, a touch pen, a pointing device, or a stylus.

The communication I/F 25 is configured to communicate with the PC 70 and the PC(s) 50 via the network 11 and/or the cable 12. Namely, the printer 10 may transmit various kinds of information to the PC 70 and the PC(s) 50 via the communication I/F 25, and may receive various kinds of information from the PC 70 and the PC(s) 50 via the communication I/F 25. For instance, the communication I/F 25 may perform wireless communication with the access point (not shown) of the network 11 in accordance with a Wi-Fi communication protocol. It is noted that as mentioned above, "Wi-Fi" is a registered trademark of Wi-Fi Alliance. Further, the communication I/F 25 may be connectable with the cable 12 (e.g., a LAN cable and a USB cable).

The controller 30 is configured to take overall control of the printer 10. As shown in FIG. 2A, the controller 30 may be, but not limited to, a microcomputer including the CPU 31, a ROM 32, a RAM 33, an EEPROM 34, and an ASIC 35.

The ROM 32 stores programs 32A to be executed by the CPU 31 to control the printer 10. The RAM 33 is usable as a storage area or a work area for temporarily storing various kinds of data when the CPU 31 executes the programs 32A. The EEPROM 34 is configured to store settings and/or flags to be retained even after the printer 10 is turned off. The CPU 31 is configured to read and execute the programs 32A stored in the ROM 32, thereby controlling the printer 10.

The ASIC 35 is connected with the conveyor 21, the ink discharger 22, the display 23, the input I/F 24, and the communication I/F 25. The ASIC 35 is configured to operate each element included in the printer 10 in accordance with instructions from the CPU 31.

The ROM 32, the RAM 33, and the EEPROM 34 may be, but not limited to, non-transitory computer-readable storage media. Besides the ROM 32, the RAM 33, and the EEPROM 34, other storage media such as CD-ROMs and DVD-ROMs may be included in the non-transitory computer-readable storage media. The non-transitory computer-readable storage media are tangible media. Meanwhile, electric signals, carrying programs downloaded from servers on the Internet, are computer-readable media but not included in the non-transitory computer-readable storage media. The same applies to a below-mentioned memory 62 of the PC 50 (which may be referred to as the "information processing terminal 50").

The EEPROM 34 stores therein device information of the printer 10. The device information includes a model name, a serial number, and a MAC address of the printer 10, and a return-to-standby time information.

The return-to-standby time information represents a return-to-standby time T1 from when the printer 10 is brought from a standby state into an active state where the printer 10 is allowed to perform printing until when the printer 10 is brought back into the standby state in response to receiving no print data. The return-to-standby time information is previously stored in the EEPROM 34. When the printer 10 is in the standby state, the power supply 26 is in a dormant state, and the nozzles of the ink discharger 22 are covered with a cap (not shown).

The ASIC 35 is configured to transmit a driving signal to the motor, thereby causing the motor to rotate. When the motor rotates, the conveyor 21 conveys the sheet, and the ink discharger 22 moves in the main scanning direction. Additionally, the ASIC 35 is configured to transmit a driving signal to a driving element (e.g., a piezoelectric element), thereby causing the ink discharger 22 to discharge ink droplets from the nozzles. Further, the ASIC 35 is configured to transmit an image signal to the display 23, thereby causing the display 23 to display thereon a screen image. Further, the ASIC 35 is configured to receive an operation signal from the input I/F 24. Moreover, the ASIC 35 is configured to receive information from an external device via the communication I/F 25 and to transmit information to an external device via the communication I/F 25.

Figure 2B:
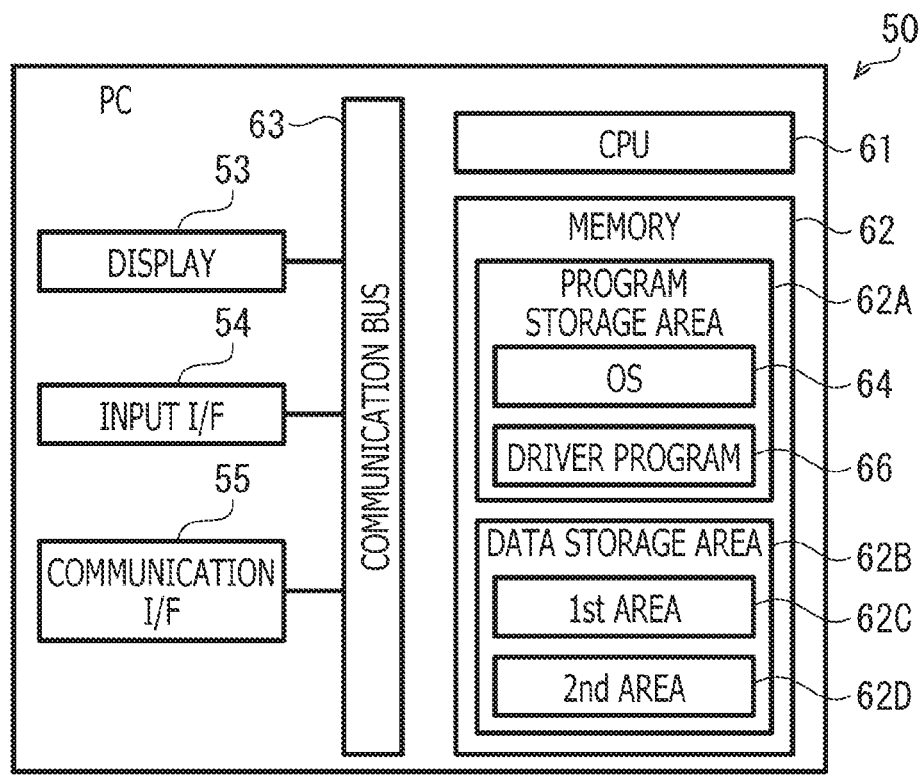
FIG. 2B is a functional block diagram showing an electrical configuration of the PC in the illustrative embodiment according to one or more aspects of the present disclosure.

As shown in FIG. 2B, the PC 50 includes a display 53, an input I/F 54, a communication I/F 55, the CPU 61, the memory 62, and a communication bus 63. The display 53, the input I/F 54, the communication I/F 55, and the CPU 61 included in the PC 50 have substantially the same configurations as the display 23, the input I/F 24, the communication I/F 25, and the CPU 31 included in the printer 10, respectively. Hence, explanations of their configurations will be omitted.

For instance, the PC 50 may be, but not limited to, a mobile phone, a smartphone, or a tablet terminal. The input I/F 54 of the PC 50 may include a mouse and a keyboard.

The memory 62 may include at least one of a RAM, a ROM, an EEPROM, an HDD, a portable storage medium (e.g., a USB memory) attachable to and detachable from the PC 50, and a buffer of the CPU 61. The memory 62 has a program storage area 62A (hereinafter, which may be simply referred to as an "area 62A") and a data storage area 62B (hereinafter, which may be simply referred to as an "area 62B"). In the area 62A, an OS 64 and the driver program 66 are installed. Each program stored in the area 62A may be a single program or an aggregation of programs. The area 62B stores therein data and/or information for executing the programs stored in the area 62A.

For instance, the OS 64 may be, but not limited to, Windows (a registered trademark of Microsoft Corporation) Operating System, Android (a registered trademark of Google Inc.) OS, or iOS (a registered trademark of Cisco Systems, Inc.). In the illustrative embodiment, Windows Operating System is exemplified as the OS 64.

The driver program 66 is configured to cause the printer 10 to perform printing in accordance with print instruction information received from the OS 64. The driver program 66 may instruct a single model of printer 10 to perform printing, or may instruct a plurality of models of printers 10 to perform printing.

The driver program 66 defines therein a plurality of functions designated by the OS 64. In response to the plurality of functions being invoked by the OS 64 in a particular order, the driver program 66 causes the printer 10 to perform the printing operation. In the illustrative embodiment, for instance, the print instruction information received from the OS 64 may represent that a function defined in the driver program 66 has been invoked by the OS 64 with a particular constant as an argument.

The area 62B includes a first area and a second area 62D. For instance, the first area 62C may be a registry that is a database of basic information regarding the OS 64 or setting information for the driver program 66.

The first area 62C stores therein condition information. The condition information represents conditions for causing the printer 10 to perform the printing operation. The condition information includes a secure flag and authentication information.

The condition information is stored into the first area 62C at a timing when the driver program 66 is installed into the area 62A. Further, the driver program 66 may change the condition information stored in the first area 62C in accordance with an instruction from a user. More specifically, the driver program 66 may read the condition information out of the first area 62C in accordance with a reference instruction from the OS 64 and cause the display 53 to display the read condition information. Subsequently, in response to accepting a user operation to change the condition information via the input I/F 54, the driver program 66 may replace the condition information stored in the first area 62C with changed condition information.

The secure flag is information representing whether to cause the printer 10 to perform "secure printing." Specifically, the secure flag set to "ON" corresponds to an instruction to cause the printer 10 to perform the secure printing. Meanwhile, the secure flag set to "OFF" corresponds to an instruction to cause the printer 10 not to perform the secure printing. The authentication information is a PIN ("PIN" is an abbreviation of "personal identification number") designated by the user. For the authentication information, a valid value is set only when the secure flag is set to "ON."

The secure printing is a printing operation to be started with an input of valid authentication information as a trigger. Namely, the printer 10 does not start the secure printing immediately after receiving print execution information instructing the printer 10 to perform the secure printing. The printer 10 starts the secure printing in response to accepting the authentication information via the input I/F 24.

Further, the area 62B includes at least one queue area. Each queue area is a memory area to store information to be transmitted to a corresponding printer 10. Each queue area is associated with a print port specifying the corresponding printer 10. For instance, the OS 64 may designate, for the driver program 66, a specific queue area as an argument for a function. Hereinafter, the specific queue area designated for the driver program 66 may be referred to as a "designated queue" or a "queue area 67A" (see FIGS. 3A and 3B).

In each queue area, information for instructing the corresponding printer 10 to perform various operations may be stored. More specifically, for instance, the queue area 67A is configured to store a preceding command shown in FIG. 3B, print execution information shown in FIG. 3A, and status transmitting instruction information (not shown). The print execution information is for instructing the printer 10 to perform the printing operation. The print execution information includes feeding instruction information, cueing instruction information, conveying instruction information, ink-discharging instruction information, and sheet-discharging instruction information. The preceding command is for instructing the printer 10 to perform the pre-printing operations. The status transmitting instruction information is for instructing the printer 10 to transmit status information representing a status of the printer 10. Nonetheless, it is noted that specific examples of information storable in each queue area are not limited to the aforementioned pieces of information.

The queue area 67A, as an example of the at least one queue area, is an area into which one or more pieces of instruction information to be transmitted by the OS 64 to the printer 10 via the communication I/F 55 are stored in a specified transmission order. In other words, the OS 64 checks whether there are one or more pieces of instruction information stored in the queue area 67A, at a particular timing. Then, in response to determining that there are one or more pieces of instruction information stored in the queue area 67A, the OS 64 transmits the one or more pieces of instruction information stored in the queue area 67A to the printer 10 via the communication I/F 55 in the specified transmission order. Afterward, the OS 64 deletes, from the queue area 67A, the same instruction information as transmitted.

More specifically, the one or more pieces of instruction information stored in the queue area 67A are provided with job IDs as shown in FIGS. 3A and 3B. The job IDs are information for identifying one or more pieces of instruction information to be serially transmitted, within the queue area 67A. Namely, the same job ID may be provided to a plurality of pieces of instruction information. The OS 64 transmits the plurality of pieces of instruction information provided with the same job ID, to the printer 10 in an order in which the plurality of pieces of instruction information have been stored into the queue area 67A. Further, the OS 64 transmits two or more pieces of instruction information provided with respective different job IDs, to the printer 10 in an order in which the different job IDs have been generated.

For instance, initially, the OS 64 transmits the conveying instruction information, the ink-discharging instruction information, and the sheet-discharging instruction information stored in the queue area 67A with a job ID "content data A" added thereto, in the same order as cited above. Subsequently, the OS 64 transmits the feeding instruction information and the cueing instruction information stored in the queue area 67A with a job ID "content data B" added thereto, in the same order as cited above. At this time, even though the feeding instruction information provided with the job ID "content data B" has been stored into the queue area 67A earlier than the sheet-discharging instruction information provided with the job ID "content data A," the sheet-discharging instruction information is transmitted earlier than the feeding instruction information. Thus, a plurality of pieces of instruction information provided with the same job ID are serially transmitted in the same order as written into the queue area 67A.

The PC 70 has substantially the same configuration as the PC 50. Therefore, an explanation about the configuration of the PC 70 will be omitted.

[Print Instruction Process]

Hereinafter, a print instruction process to be executed by the CPU 61 executing the driver program 66 will be described with reference to FIG. 4. The driver program 66 may cause the CPU 61 to perform various processes. In the following description, an explanation will be provided of the print instruction process in which the driver program 66 (more specifically, the CPU 61 executing the driver program 66) determines whether to transmit the preceding command, and according to the determination, transmits the preceding command before transmitting print data or transmits the print data without transmitting the preceding command. In the following description, particularly significant processes and operations may be set forth, but explanations of the other processes and operations may be omitted.

Each flowchart exemplified in the present disclosure basically shows a process by the CPU 31 or the CPU 61 in accordance with instructions written in a corresponding program. Namely, in the following description, processes and/or operations such as "determining," "extracting," "selecting," and "controlling" may be performed by the CPU 31 or the CPU 61. Processes and/or operations by the CPU 61 may include hardware control by the CPU 61 via the OS 64. Further, "data" in the present disclosure may be expressed by computer-readable bit strings. Moreover, two or more pieces of data having substantially the same contents and expressed in mutually different formats may be treated as the same data. The same applies to "information" in the present disclosure.

The driver program 66 is configured to, in response to a function defined therein being invoked by the OS 64, receive print instruction information including a print instruction. The driver program 66 determines whether the print instruction information has been received (S11). In response to determining that the print instruction information has not been received (S11: No), the driver program 66 terminates the print instruction process.

Meanwhile, in response to determining that the print instruction information has been received (S11: Yes), the driver program 66 determines whether print data is already present in a queue designated by the print instruction information (S12).

In response to determining that print data is already present in a queue designated by the print instruction information (S12: Yes), the driver program 66 skips the steps S13 to S17, S21, and S22, and performs a StartPage process to generate print execution information (S18).

[StartPage Process]

The StartPage process is performed for each piece of page data included in designated content data. For instance, a piece of page data to be processed in the StartPage process is designated by the OS 64 as an argument for a function. The StartPage process will be described in detail with reference to FIG. 7A.

The OS 64 invokes a function "DrvStartPage( )" defined in the driver program 66 (S71). In response to the function "DrvStartPage( )" being invoked, the driver program 66 generates header instruction information and stores the generated header instruction information into the queue area 67A (S72). The header instruction information is print execution information for specifying an operation to be performed in advance of printing an image on a sheet in a sequence of operations to form the image on the sheet. In the illustrative embodiment, the header instruction information may include the feeding instruction information and the cueing instruction information.

Then, the driver program 66 terminates the function "DrvStartPage( )" (S73). Subsequently, the OS 64 invokes drawing functions defined in the driver program 66. The driver program 66 performs a plurality of drawing functions in a particular order, thereby generating print data from the page data (S74). For instance, the print data may be raster data generated by rasterizing the page data. Further, the driver program 66 generates print execution information for causing the printer 10 to perform printing based on the print data, and stores the generated print execution information into the queue area 67A. As will be described later, in S74, the ink-discharging instruction information and the conveying instruction information are generated. Hereinafter, a process for the driver program 66 to generate the print execution information will be described in detail.

Initially, the driver program 66 transmits, to the OS 64, unit information representing a unit for data to be communicated as a rasterization target. For example, "page" which specifies data communication on the basis of a piece of page data as a single unit may be set as the unit information. In another example, "band" which specifies data communication on the basis of a piece of band data as a single unit may be set as the unit information. The band data is a part of the page data.

The OS 64, which has acquired the unit information "page," provides the page data to the driver program 66 in S74. The driver program 66 rasterizes the whole page data received from the OS 64, thereby generating raster data. Next, the driver program 66 rotates the raster data developed in the area 62B by 90 degrees within the area 62B. Subsequently, the driver program 66 extracts a plurality of pieces of pass data representing an image to be recorded in one of print areas, from the raster data rotated by 90 degrees. Then, the driver program 66 generates ink-discharging instruction information and conveying instruction information based on each of the extracted pieces of pass data, and serially writes the generated pieces of ink-discharging instruction information and the generated pieces of conveying instruction information into the queue area 67A. The driver program 66 sequentially performs, for every piece of pass data included in the page data, the aforementioned operations such as extracting the pass data, generating the ink-discharging instruction information and the conveying instruction information, and writing the generated information into the queue area 67A.

Meanwhile, the OS 64, which has acquired the unit information "band," provides one of the plurality of pieces of band data included in the page data to the driver program 66 in S74. The driver program 66 rasterizes the whole band data received from the OS 64, thereby generating raster data. Next, the driver program 66 generates ink-discharging instruction information and conveying instruction information based on the generated raster data, and writes the generated ink-discharging instruction information and the generated conveying instruction information into the queue area 67A. Thus, the aforementioned operations are repeatedly performed for every piece of band data included in the page data.

Subsequently, the OS 64 invokes a function "DrvEndPage( )" defined in the driver program 66 (S75). In response to the function "DrvEndPage( )" being invoked, the driver program 66 generates sheet-discharging instruction information, and stores the generated sheet-discharging instruction information into the queue area 67A (S76).

The plurality of pieces of print execution information written into the queue area 67A in the StartPage process shown in FIG. 7A are transmitted by the OS 64 to the printer 10 in the same order as written into the queue area 67A. Typically, the OS 64 may transmit, to the printer 10 via the communication I/F 55, the feeding instruction information, the cueing instruction information, the ink-discharging instruction information, the conveying instruction information, the ink-discharging instruction information, . . . , and the sheet-discharging instruction information in the same order as cited above.

The, the driver program 66 terminates the function "DrvEndPage( )" (S77). Thereby, the StartPage process is terminated. By execution of the StartPage process, the print data is transmitted by the OS 64 from the print port to the printer 10.

Next, referring back to FIG. 4, in response to determining that print data is not present in the designated queue (S12: No), the driver program 66 determines whether a setting value of the secure flag represented by the print instruction information is "ON" (S13). Namely, in S13, the driver program 66 determines whether the printing operation specified by the print execution information is secure printing.

In response to determining that the setting value of the secure flag is "ON" (S13: Yes), the driver program 66 skips the steps S14 to S17, S21, and S22 and performs the StartPage process to generate print data (S18).

Meanwhile, in response to determining that the setting value of the secure flag is "OFF" (S13: No), the driver program 66 performs a preceding-command output determination process (S14). The preceding-command output determination process will be described in detail with reference to FIG. 5A.

The driver program 66 determines whether a setting value of a discrimination flag represented by the print instruction information is "ON" (S31). When the printer 10 specified by the print instruction information is a shared printer 10, the discrimination flag is set to "ON." Meanwhile, when the printer 10 specified by the print instruction information is not a shared printer 10, the discrimination flag is set to "OFF."

In response to determining that the setting value of the discrimination flag represented by the print instruction information is not "ON" (S31: No), the driver program 66 sets a preceding command flag to "ON" (S32), and then terminates the preceding-command output determination process. The preceding command flag is for the driver program 66 to determine whether to output the preceding command Details about the preceding command flag will be described later.

Meanwhile, in response to determining that the setting value of the discrimination flag represented by the print instruction information is "ON" (S31: Yes), the driver program 66 performs a determining process for shared printer (S33). The determining process for shared printer will be described in detail with reference to FIG. 5B.

The driver program 66 reads management information and port setting information out of the memory 62 (S41). The management information represents information selected by an administrator of the PC 50 from among selectable options "output," "not output," and "output as set."

The port setting information is input into the PC 50 by the user of the PC 50. Specifically, the driver program 66 causes the display 53 to display a port setting information input screen as shown in FIG. 9.

As shown in FIG. 9, the port setting information input screen includes character strings "Port Setting" and "Information on the print port for outputting the preceding command even when the printer is shared." Further, the port setting information input screen includes a character string "Transmit the preceding command via the print port as a USB port" and a corresponding checkbox (hereinafter, which may be referred to as a "first object").

Further, the port setting information input screen includes a character string "Conditions for determining whether to transmit the preceding command via the print port as a LAN port." Further, the port setting information input screen includes a character string "Determine whether to transmit the preceding command, depending on whether the print port is a wired port or a wireless port" and a corresponding radio button. Further, the port setting information input screen includes a character string "Transmit the preceding command via the print port as a wired port" and a corresponding checkbox (hereinafter, which may be referred to as a "second object"). Further, the port setting information input screen includes a character string "Transmit the preceding command via the print port as a wireless port" and a corresponding checkbox (hereinafter, which may be referred to as a "third object"). Further, the port setting information input screen includes a character string "Determine whether to transmit the preceding command, depending on a measured communication speed for communication with the printer" and a corresponding radio button.

In response to accepting a user operation of selecting a checkbox and/or a radio button on the port setting information input screen via the input I/F 54, the driver program 66 stores, into the memory 62, port setting information according to the accepted user operation.

Referring back to FIG. 5B, the driver program 66 determines which information is represented by the management information among "output," "not output," and "output as set" (S42). In response to determining that the management information represents "output" (S42: Output), the driver program 68 sets the preceding command flag to "ON" (S43), and then terminates the determining process for shared printer. In response to determining that the management information represents "not output" (S42: Not output), the driver program 68 sets the preceding command flag to "OFF" (S44), and then terminates the determining process for shared printer.

Meanwhile, in response to determining that the management information represents "output as set" (S42: Output as set), the driver program 68 determines whether the print port is a USB port or a LAN port (S45). Specifically, the driver program 66 acquires a port name of the print port from the OS 64. When the printer 10 is a shared printer 10, the driver program 66 acquires the same port name as set in the PC 70. When the OS 64 is a Windows (a registered trademark of Microsoft Corporation) Operating System, the driver program 66 may separately set the port name, an IP address specified as an actual transmission destination on the network, and a node name. These pieces of information are stored in a particular registry of the memory 62. Hence, in response to acquiring the port name, the driver program 66 searches the particular registry and acquires an IP address and/or a node name based on the acquired port name. Then, the driver program 66 determines whether the print port is a USB port or a LAN port, based on the port name of the print port and at least one of the IP address and the node name.

In response to determining that the print port is a USB port (S45: USB), the driver program 66 determines whether the port setting information represents "Transmit the preceding command via the print port as a USB port" (S46). In response to determining that the port setting information does not represent "Transmit the preceding command via the print port as a USB port" (S46: No), the driver program 66 sets the preceding command flag to "OFF." Meanwhile, in response to determining that the port setting information represents "Transmit the preceding command via the print port as a USB port" (S46: Yes), the driver program 66 sets the preceding command flag to "ON."

In response to determining that the print port is a LAN port (S45: LAN), the driver program 66 performs a determining process for LAN port (S48). The determining process for LAN port will be described in detail with reference to FIG. 6.

Initially, the driver program 66 determines which information is represented by the port setting information between "Determine whether to transmit the preceding command, depending on whether the print port is a wired port or a wireless port" and "Determine whether to transmit the preceding command, depending on a measured communication speed for communication with the printer" (S51). In response to determining that the port setting information represents "Determine whether to transmit the preceding command, depending on a measured communication speed for communication with the printer" (S51: Communication Speed), the driver program 66 receives, from the printer 10, the return-to-standby time T1 stored in the EEPROM 34 (S52).

Specifically, the driver program 66 generates request information and transmits the generated request information to the printer 10. The request information includes a command to cause the printer 10 to return device information of the printer 10, and an address (e.g., an IP address or a MAC address) of the printer 10. In response to receiving the request information, the printer 10 returns the device information to the PC 50. The driver program 66 acquires the return-to-standby time T1 from the received device information.

Subsequently, the driver program 66 acquires a reference communication time T2 (S53). Specifically, the driver program 66 generates a PING command including the address of the printer 10, and provides the generated PING command to the OS 64. The OS 64 transmits particular request information to the printer 10 in accordance with the PING command, and receives a reply from the printer 10. The OS 64 measures a period of time from when the OS 64 has transmitted the particular request information until when the OS 64 receives the reply. The OS 64 provides result information representing the measured period of time to the driver program 66. The driver program 66 acquires, as the reference communication time T2, the period of time represented by the received result information.

The driver program 66 calculates a sum of the reference communication time T2 and a particular time T3 previously stored in the memory 62, and determines whether the calculated sum is less than the return-to-standby time T1 acquired in S52 (S54). The particular time T3 is a period of time from when transmitting the preceding command until when adding the header instruction information to the print job (S72), and is previously stored in the memory 62. Namely, in S54, the driver program 66 determines whether a period of time from when the printer 10 receives the preceding command and then makes a transition from the standby state into the active state until when the printer 10 receives the header instruction information is shorter than the return-to-standby time T1.

In response to determining that the calculated sum (T2+T3) is not less than the return-to-standby time T1 (S54: No), the driver program 66 sets the preceding command flag to "OFF" (S56). Afterward, the driver program 66 terminates the determining process for LAN port. Meanwhile, in response to determining that the calculated sum (T2+T3) is less than the return-to-standby time T1 (S54: Yes), the driver program 66 sets the preceding command flag to "ON" and sets a direct transmission flag to "ON" (S55). Thereafter, the driver program 66 terminates the determining process for LAN port.

The direct transmission flag is configured to be set to "ON" when the printer 10 to which the print execution information is to be transmitted is a shared printer 10 and connected with the network 11 via a LAN, and the preceding command flag is set to "ON." As will be described in detail later, in response to determining that the direct transmission flag is set to "ON," the driver program 66 generates the print execution information including the print data generated in S74 and transmission information including the address of the shared printer 10, and transmits the generated print execution information and the generated transmission information to the shared printer 10, without providing the print data generated in S74 to the OS 64. Thus, the print execution information including the print data is transmitted to the shared printer 10 without involving the print port. In other words, the print execution information is directly transmitted to the shared printer 10 without involving the PC 70.

In response to determining that the port setting information represents "Determine whether to transmit the preceding command, depending on whether the print port is a wired port or a wireless port" (S51: Wired/Wireless), the driver program 66 determines whether the print port is a wired port or a wireless port (S57). Specifically, in S57, the driver program 66 determines whether the print port is a wired port or a wireless port, based on the port name of the print port.

In response to determining that the print port is a wired port (S57: Wired), the driver program 66 determines whether the port setting information represents "Transmit the preceding command via the print port as a wired port" (S61). In response to determining that the port setting information does not represent "Transmit the preceding command via the print port as a wired port" (S61: No), the driver program 66 sets the preceding command flag to "OFF" (S56). Thereafter, the driver program 66 terminates the determining process for LAN port. Meanwhile, in response to determining that the port setting information represents "Transmit the preceding command via the print port as a wired port" (S61: Yes), the driver program 66 sets the preceding command flag to "ON" (S60). Afterward, the driver program 66 terminates the determining process for LAN port.

In response to determining that the print port is a wireless port (S57: Wireless), the driver program 66 determines whether the port setting information represents "Transmit the preceding command via the print port as a wireless port" (S58). In response to determining that the port setting information does not represent "Transmit the preceding command via the print port as a wireless port" (S58: No), the driver program 66 sets the preceding command flag to "OFF" (S59). Afterward, the driver program 66 terminates the determining process for LAN port. Meanwhile, in response to determining that the port setting information represents "Transmit the preceding command via the print port as a wireless port" (S58: Yes), the driver program 66 sets the preceding command flag to "ON" and sets the direct transmission flag to "ON" (S60). Thereafter, the driver program 66 terminates the determining process for LAN port.

In response to determining in S57 that it is unknown whether the print port is a wired port or a wireless port (S57: Unknown), the driver program 66 determines whether setting information represents "Transmit the preceding command when it is unknown whether the print port is a wired port or a wireless port" (S62). The setting information may be input by the user via the port setting information input screen, or may be set by the administrator of the PC 50.

In response to determining that the setting information does not represent "Transmit the preceding command when it is unknown whether the print port is a wired port or a wireless port" (S62: No), the driver program 66 sets the preceding command flag to "OFF" (S59). Afterward, the driver program 66 terminates the determining process for LAN port. Meanwhile, in response to determining that the setting information represents "Transmit the preceding command when it is unknown whether the print port is a wired port or a wireless port" (S62: Yes), the driver program 66 sets the preceding command flag to "ON" and sets the direct transmission flag to "ON" (S63). Then, the driver program 66 terminates the determining process for LAN port.

Referring back to FIG. 4, after completion of the preceding-command output determination process (S14), the driver program 66 determines whether the preceding command flag is "ON" (S15). In response to determining that the preceding command flag is not "ON" (S15: No), the driver program 66 skips the steps S16, S17, S21, and S22, and performs the StartPage process in S18.

Meanwhile, in response to determining that the preceding command flag is "ON" (S15: Yes), the driver program 66 determines whether the direct transmission flag is "ON" (S16). In response to determining that the direct transmission flag is "ON" (S16: Yes), the driver program 66 identifies the address of the shared printer 10 based on the earlier-acquired port name and the earlier-acquired node name and/or IP address, and generates preceding command transmission information including the preceding command and the address of the shared printer 10 (S21). Then, the driver program 66 directly transmits the generated preceding command transmission information to the shared printer 10 without involving the print port or the PC 70 (S22). After the direct transmission of the preceding command transmission information, the driver program 66 performs the StartPage process in S18.

In response to determining that the direct transmission flag is not "ON" (S16: No), the driver program 66 performs a StartDoc process (S17). Referring to FIG. 7B, the StartDoc process will be described in detail.

[StartDoc Process]

The OS 64 invokes various functions defined in the driver program 66, in a particular order. Further, the driver program 66 performs respective processes defined by the functions invoked by the OS 64. Explanations on details of these processes will be omitted.

The OS 64 invokes a function "DrvDocumentEvent( )" (S81). The OS 64 designates a constant "DOCUMENT-EVENT_FIRST" as an argument for the function "DrvDocumentEvent( )."

Subsequently, in response to the function "DrvDocumentEvent( )" being invoked, the driver program 66 reads out the condition information stored in the first area 62C, and stores the read condition information into the second area 62D (S82). Afterward, the driver program 66 terminates the function "DrvDocumentEvent( )" (S83). Thus, in S82, the driver program 66 stores, into the second area 62D, the condition information read out of the first area 62C.

Next, the OS 64 invokes the function "DrvDocumentEvent( )" (S84). The OS 64 designates a constant "DOCUMENTEVENT_STARTDOC" as an argument for the function "DrvDocumentEvent( )" The step S84 is executed later than S81. Subsequently, the driver program 66, from which the function "DrvDocumentEvent( )" has been invoked, stores the preceding command into the designated queue (S85).

Next, the driver program 66 terminates the function "DrvDocumentEvent( )" (S86). Then, in response to the function "DrvDocumentEvent( )" being terminated (S86), the OS 64 invokes a function "DrvStartDoc( )" defined in the driver program 66 (S87). The OS 64 designates data ID "content data C" as an argument for the function "DrvStartDoc( )."

Subsequently, in response to the function "DrvStartDoc( )" being invoked, the driver program 66 generates a print job having the designated data ID "content data C" as a job ID thereof, in the designated queue (i.e., the queue area 67A) (S88). Then, the driver program 66 terminates the function "DrvStartDoc( )" (S89). To various kinds of execution information written into the queue area 67A in the aforementioned steps S72, S74, and S76, the job ID "content data C" is added. Nonetheless, it is noted that the print job identified by the job ID "content data C" does not include any instruction information at this time.

Next, in response to the function "DrvStartDoc( )" being terminated (S89), the OS 64 invokes the function "DrvDocumentEvent( )" (S90). The OS 64 designates a constant "DOCUMENTEVENT_STARTDOCPOST" as an argument for the function "DrvDocumentEvent( )" Subsequently, in response to the function "DrvDocumentEvent( )" being invoked, the driver program 66 deletes the preceding command from the designated queue (S91).

Next, the driver program 66 terminates the function "DrvDocumentEvent( )" (S92). Thereby, the StartDoc process is terminated. Although the following operation is not expressly shown in any flowcharts, as the StartDoc process is performed, the preceding command stored in the designated queue is transmitted by the OS 64 to the printer 10 via the print port.

Referring back to FIG. 4, after completion of the StartDoc process, the driver program 66 performs the aforementioned StartPage process (S18). Subsequently, the driver program 66 determines whether the StartPage process has been performed for every page (S19). In response to determining that the StartPage process has not been performed for every page (i.e., determining that there is a next page for which the StartPage process has not been performed) (S19: Yes), the driver program 66 performs the StartPage process for the next page (S18). Meanwhile, in response to determining that the StartPage process has been performed for every page (i.e., determining that there is not a next page for which the StartPage process has not been performed) (S19: No), the driver program 66 performs an EndDoc process (S20). The EndDoc process is post-processing to be executed after having caused the printer 10 to perform the printing operation. The EndDoc process has been known, and therefore an explanation thereof will be omitted.

By execution of the StartPage process, the print execution information including the print data is transmitted by the OS 64 to the printer 10 via the print port. The printer 10, which has received the print execution information or received both the preceding command and the print execution information, performs a printing process. Referring to FIG. 8, the printing process will be described in detail.

[Printing Process]

Each of the following processes and operations to be performed by the printer 10 may be implemented by the CPU 31 executing one or more programs 32A stored in the ROM 32, or may be implemented by one or more hardware circuits included in the controller 30.

The controller 30 of the printer 10 determines which information has been received from the PC 50 via the communication I/F 25, between the preceding command and the print execution information (S101). As described above, the preceding command is transmitted by the OS 64 to the printer 10 by execution of the StartDoc process, or is transmitted by the driver program 66 to the printer 10 in S22. The print execution information is transmitted by the OS 64 to the printer 10 by execution of the StartPage process.

In response to determining that the controller 30 has received the preceding command (S101: Preceding Command), the controller 30 determines whether the power supply 26 is in the dormant state (S102). For instance, the controller 30 may store flag information representing a current state of the power supply 26 in the RAM 33 or the EEPROM 34, and may make the determination in S102 based on the flag information. Nonetheless, the method for making the determination in S102 is not limited to the above-exemplified method but may be another method.

Subsequently, in response to determining that the power supply 26 is in the dormant state (S102: Yes), the controller 30 brings the power supply 26 into the driven state from the dormant state (S103). More specifically, the controller 30 sends a high-level power supply signal to the power supply 26. Meanwhile, in response to determining that the power supply 26 is in the driven state (S102: No), the controller 30 goes to S104 without executing S103.

Next, the controller 30 provides, via the display 23, a notification that the controller 30 has received the preceding command (S104). For instance, the controller 30 may provide the notification by keeping a backlight of the display 23 turned on for a predetermined period of time.

Subsequently, the controller 30 causes the image former 20 to perform the pre-printing operations (S105). The pre-printing operations are operations which the printer 10 needs to perform so as to secure a particular level of print quality in the printing operation. For instance, the pre-printing operations may include at least one of an uncapping process, a flashing process, and a boosting process. The uncapping process is for separating the cap to cover the nozzle surface away from the ink discharger 22. The flashing process is for causing the ink discharger 22 to discharge ink droplets outside an area over which the sheet passes. The boosting process is for boosting a voltage supplied from the power supply 26 up to a target voltage.

Further, the controller 30 stores flag information corresponding to each of the pre-printing operations in the RAM 33 or the EEPROM 34. Every piece of flag information is set to "OFF" at a time when the pre-printing operations are started. It is noted that each piece of flag information set to "OFF" represents that a corresponding one of the pre-printing operations is not completed. Then, in response to completing one of the pre-printing operations, the controller 30 sets corresponding flag information to "ON" which is a setting value representing that a corresponding pre-printing operation is completed.

subsequently, the controller 30 receives the print execution information from the PC 50 via the communication I/F

25 (S101: Print Execution Information). Namely, the controller 30 receives, from the PC 50 via the communication I/F 25, the feeding instruction information, the cueing instruction information, the ink-discharging instruction information, the conveying instruction information, the ink-discharging instruction information, . . . , and the sheet-discharging instruction information in the same order as cited above.

The feeding instruction information is for causing the conveyor 21 to feed a sheet from a feed tray specified by tray information included in editable condition information. The cueing instruction information is for causing the conveyor 21 to convey the sheet to a position where a first recording area of the fed sheet is opposed to the ink discharger 22. The ink-discharging instruction information indicates an ink discharging timing for the ink discharger 22 to discharge ink droplets to form an image in a recording area of the sheet opposed to the ink discharger 22. The conveying instruction information is for causing the conveyor 21 to convey the sheet to a position where a next recording area of the sheet is opposed to the ink discharger 22. The sheet-discharging instruction information is for causing the conveyor 21 to discharge the sheet with an image formed thereon.

Next, the controller 30 determines whether the setting value of the secure flag included in the print execution information is "ON" or "OFF" (S106). In response to determining that the setting value of the secure flag is "OFF" (S106: OFF), the controller 30 determines whether the pre-printing operations have been completed (S107). More specifically, in response to all pieces of flag information associated with the pre-printing operations being set to "ON," the controller 30 determines that the pre-printing operations have been completed (S107: Yes). Meanwhile, in response to at least one of the respective pieces of flag information associated with the pre-printing operations being set to "OFF," the controller 30 determines that the pre-printing operations have not been completed (S107: No).

A reception interval between a time when the preceding command is received and a time when the print execution information is received varies, for instance, depending on a processing amount of the driver program 66 generating the print data (S74) and/or a state of the network 11. Namely, there is a possibility that the pre-printing operations, as started with the preceding command as a trigger, may not be completed at the time when the print execution information is received. Hence, in response to determining that the pre-printing operations have not been completed (S107: No), the controller 30 waits until the pre-printing operations have been completed, without performing the following operations. Meanwhile, in response to determining that the pre-printing operations have been completed (S107: Yes), the controller 30 causes the image former 20 to perform the printing operation in accordance with the received print execution information (S108 to S112).

In the printing operation, initially, the controller 30 performs a feeding process according to the received feeding instruction information and a cueing process according to the received cueing instruction information (S108). Thereby, the controller 30 causes the conveyor 21 to feed a sheet out of a feed tray specified by the feeding instruction information. Subsequently, the controller 30 causes the conveyor 21 to convey the fed sheet to a position specified by the cueing instruction information. It is noted that the feeding process and the cueing process may be included in the pre-printing operations.

Subsequently, the controller 30 performs an ink discharging process according to the received ink-discharging instruction information (S109). Specifically, in S109, the controller 30 controls the ink discharger 22 to discharge ink droplets at ink discharging timings specified by the ink-discharging instruction information while moving from one end to another in the main scanning direction. Next, the controller 30 determines whether image formation has been completed over all the recording areas of the sheet (S110). In other words, in S110, the controller 30 determines whether instruction information received following the ink-discharging instruction information used in the previous step S109 is the conveying instruction information or the sheet-discharging instruction information.

Then, in response to determining that image formation has not been completed over all the recording areas of the sheet (S110: No), the controller 30 performs a conveying process according to the received conveying instruction information (S111). Specifically, in S111, the controller 30 controls the conveyor 21 to convey the sheet over a distance specified by the conveying instruction information. The controller 30 repeatedly performs the steps S109 to S111 until image formation has been completed over all the recording areas of the sheet (S110: No).

Then, in response to determining that image formation has been completed over all the recording areas of the sheet (S110: Yes), the controller 30 performs a sheet discharging process according to the received sheet-discharging instruction information (S112). Specifically, in S112, the controller 30 causes the conveyor 21 to discharge the sheet with an image formed thereon out of the printer 10. When the designated content data includes a plurality of pieces of page data, the controller 30 repeatedly performs the steps S108 to S112. Thereby, an image represented by the print data generated in S74, i.e., an image represented by the designated content data is formed on the sheet.

Meanwhile, in response to determining that the setting value of the secure flag is "ON" (S106: ON), the controller 30 accepts authentication information via the input I/F 24. Then, the controller 30 determines whether the authentication information input via the input I/F 24 is coincident with authentication information included in the print execution information (S113). Next, in response to determining that the authentication information input via the input I/F 24 is coincident with the authentication information included in the print execution information (S113: Yes), the controller 30 performs the pre-printing operations (S114). Then, in response to completion of the pre-printing operations, the controller 30 executes S108 and the following steps. Meanwhile, in response to determining that the authentication information input via the input I/F 24 is not coincident with the authentication information included in the print execution information (S113: No), the controller 30 prompts the user to again input authentication information.

[Operations and Advantageous Effects of Illustrative Embodiment]

In the illustrative embodiment, it is determined whether to instruct the printer 10 to start the pre-printing operations via the preceding command, using at least one of the information (e.g., the discrimination flag represented by the print instruction information) representing whether the printer 10 specified by the print instruction information is a shared printer 10, and the reference communication time T2 representing a period of time required for communication with the printer 10. Thus, it is possible to appropriately determine whether to transmit the preceding command to instruct the printer 10 to start the pre-printing operations.

Further, in the illustrative embodiment, when the return-to-standby time T1 is determined to be longer than a period of time required for generation and transmission of the print data, the preceding command is not transmitted to the printer 10. It is noted that the return-to-standby time T1 is equivalent to a period of time from when the printer 10 completes the pre-printing operations until when the printer 10 is brought back into a state before performing the pre-printing operations. Accordingly, it is possible to prevent deterioration in print quality due to drying of ink, wasteful consumption of ink resulting from discharging dried ink, and wasteful consumption of electric power.

Further, in the illustrative embodiment, when the printer 10 specified by the print instruction information is a shared printer 10, the print data is directly transmitted to the shared printer 10 without involving the print port or the PC 70. Accordingly, it is possible to prevent an unintentional increase in number of printed sheets caused by the PC 70 erroneously determining that the preceding command is print data.

Further, in the illustrative embodiment, the first to third objects for accepting user inputs are displayed on the display 53 of the PC 50. Thereby, it is determined whether to transmit the preceding command, in accordance with the user inputs accepted via the first to third objects on the display 53. Accordingly, it is determined whether to transmit the preceding command, based on a user's intention.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, the following modifications according to aspects of the present disclosure are feasible.

[First Modification]

In the aforementioned illustrative embodiment, the driver program 66 determines whether to set the preceding command flag to "ON" or "OFF," based on the port setting information input by the user via the port setting information input screen and the management information set by the administrator. In a first modification according to aspects of the present disclosure, the driver program 66 may determine whether to transmit the preceding command, with no need for accepting the port setting information input by the user or the management information set by the administrator.

In the first modification, the driver program 66 performs a determining process for shared printer as shown in FIG. 10 in place of the determining process for shared printer as shown in FIG. 5B. The other processes may be the same as exemplified in the aforementioned illustrative embodiment. It is noted that substantially the same operations (steps) as exemplified in the aforementioned illustrative embodiment will be provided with the same reference characters, and explanations thereof may be omitted.

As shown in FIG. 10, in the determining process for shared printer of the first modification, the driver program 66 determines whether the print port, set for the shared printer 10 specified by the print instruction information, is a USB port or a LAN port, based on the port name of the print port (S45). Namely, in S45, the driver program 66 determines whether the PC 50 is connected with the printer 10 specified by the print instruction information via the cable 12 or connected therewith via a LAN.

In response to determining that the print port, as set for the shared printer 10 specified by the print instruction information, is a USB port (S45: USB), the driver program 66 sets the preceding command flag to "ON" (S43). Then, the driver program 66 terminates the determining process for shared printer. Meanwhile, in response to determining that the print port, as set for the shared printer 10 specified by the print instruction information, is a LAN port (S45: LAN), the driver program 66 determines whether the printer 10 specified by the print instruction information is connected with the network 11 via a wired LAN or connected therewith via a wireless LAN (S57).

In response to determining that the printer 10 specified by the print instruction information is connected with the network 11 via a wired LAN (S57: Wired), the driver program 66 executes the steps S52 to S54 in the same manner as the aforementioned illustrative embodiment. In response to determining in S54 that the sum of the reference communication time T2 and the particular time T3 is not less than the return-to-standby time T1 (S54: No), the driver program 66 sets the preceding command flag to "OFF" (S59). Then, the driver program 66 terminates the determining process for shared printer.

Meanwhile, in response to determining that the sum of the reference communication time T2 and the particular time T3 is less than the return-to-standby time T1 (S54: Yes), the driver program 66 sets the preceding command flag to "ON" and sets the direct transmission flag to "ON" (S55). Then, the driver program 66 terminates the determining process for shared printer.

Further, in response to determining in S57 that it is unknown whether the print port is a wired port or a wireless port (S57: Unknown), the driver program 66 sets the preceding command to "OFF" (S59). Then, the driver program 66 terminates the determining process for shared printer.

[Advantageous Effects of First Modification]

In the first modification, the driver program 66 determines whether to transmit the preceding command, independently of settings input by the user or the administrator. Therefore, it is possible to reduce troublesome operations for the user or the administrator to input setting conditions.

In general, the wireless LAN connection is likely to require more reattempts to perform communication or establish the connection than the wired LAN connection. In other words, the wireless LAN connection is likely to require a longer period of time for data communication than the wired LAN connection. In the first modification, when the PC 50 is connected with the printer 10 via a wired LAN, the preceding command is transmitted to the printer 10. Meanwhile, when the PC 50 is connected with the printer 10 via a wireless LAN, the preceding command is not transmitted to the printer 10. In other words, the preceding command is not transmitted via the wireless LAN connection that is likely to require a longer interval from when the printer 10 receives the preceding command until when the printer 10 receives the print data. Accordingly, it is possible to prevent deterioration in print quality due to drying of ink, wasteful consumption of ink resulting from discharging dried ink, and wasteful consumption of electric power.

[Second Modification]

The steps S11 to S16, S21 and S22 (see FIG. 4) and S85 (see FIG. 7B) set forth in the aforementioned illustrative embodiment may be executed as a partial process (e.g., a subroutine) of the StartDoc process set forth with reference to FIG. 7B. In a second modification according to aspects of the present disclosure, another StartDoc process will be presented with reference to FIG. 11A. It is noted that substantially the same operations (steps) as exemplified in the aforementioned illustrative embodiment will be provided with the same reference characters, and explanations thereof may be omitted.

The StartDoc process shown in FIG. 11A is different from the StartDoc process shown in FIG. 7B in that the StartDoc process shown in FIG. 11A includes a step S93 in place of S85 in FIG. 7B. In S93, the driver program 66 performs a preceding command process that is a subroutine including the same steps S11 to S16, S21 and S22 as shown in FIG. 4 and the same step S85 as shown in FIG. 7B. The other steps S81 to S84 and S86 to S92 of the StartDoc process shown in FIG. 11A are substantially the same as those of the StartDoc process shown in FIG. 7B.

The preceding command process in S93 will be described with reference to FIG. 11B. In the preceding command process in S93, the driver program 66 performs the steps S11 to S15 in the same manner as executed in the print instruction process (see FIG. 4) of the aforementioned illustrative embodiment. The driver program 66 terminates the preceding command process in response to determining that the print instruction information has not been received (S11: No), or determining that print data is already present in a queue designated by the print instruction information (S12: Yes), or determining that the setting value of the secure flag is "ON" (S13: Yes), or determining that the preceding command flag is not "ON" (S15: No).

Meanwhile, in response to determining that the preceding command flag is "ON" (S15: Yes), the driver program 66 determines whether the direct transmission flag is "ON" (S16), in the same manner as executed in the aforementioned illustrative embodiment. In response to determining that the direct transmission flag is "ON" (S16: Yes), the driver program 66 performs S21 and S22 in the same manner as executed in the aforementioned illustrative embodiment. Afterward, the driver program 66 terminates the preceding command process. Meanwhile, in response to determining that the direct transmission flag is not "ON" (S16: No), the driver program 66 stores the preceding command into the designated queue (S85). Then, the driver program 66 terminates the preceding command process.

After completion of the preceding command process (S93), the driver program 66 performs S86 to S92 in the same manner as executed in the aforementioned illustrative embodiment. Then, the driver program 66 terminates the preceding command process. After completion of the StartDoc process, the driver program 66 performs S18 to S20 set forth in the aforementioned illustrative embodiment.

As described above, the operations (steps) to be executed by the driver program 66 in the second modification are substantially the same as those of the aforementioned illustrative embodiment. The second modification is different from the aforementioned illustrative embodiment in that the steps S11 to S16, S21 and S22 are executed as a partial process included in the StartDoc process. Namely, the driver program 66 may perform, at an appropriate timing, the preceding-command output determination process (S14 in FIG. 5A) to determine whether to transmit the preceding command. In other words, the second modification provides another example of the timing for the driver program 66 to perform the preceding-command output determination process.

[Other Modifications]

In the aforementioned illustrative embodiment and modifications, the preceding command flag is set based on whether the printer 10 specified by the print instruction information is a shared printer 10 and on whether the sum of the reference communication time T2 and the particular time T3 is less than return-to-standby time T1. However, the preceding command flag may be set based only on whether the printer 10 specified by the print instruction information is a shared printer 10 or only on whether the sum of the reference communication time T2 and the particular time T3 is less than return-to-standby time T1.

Further, in the aforementioned illustrative embodiment and modifications, when the printer 10 specified by the print instruction information is a shared printer 10, and the preceding command flag is set to "ON," the direct transmission flag is set to "ON," and the print execution information is transmitted to the shared printer 10 without involving the print port or the PC 70. However, when the printer 10 specified by the print instruction information is a shared printer 10, the preceding command flag may be set to "OFF" with no exception.

Further, in the aforementioned illustrative embodiment and modifications, the reference communication time T2 is measured by using the PING command. However, without using the PING command, the driver program 66 may transmit request information to the address of the shared printer 10, and may measure a period of time from when the driver program 66 has transmitted the request information until when the driver program 66 receives a reply from the shared printer 10.

Further, in the aforementioned illustrative embodiment and modifications, the port setting information input screen includes the character strings "Port Setting" and "Information on the print port for outputting the preceding command even when the printer is shared," further includes the character string "Transmit the preceding command via the print port as a USB port" and the corresponding checkbox, further includes the character string "Conditions for determining whether to transmit the preceding command via the print port as a LAN port," further includes the character string "Determine whether to transmit the preceding command, depending on whether the print port is a wired port or a wireless port" and the corresponding radio button, further includes the character string "Transmit the preceding command via the print port as a wired port" and the corresponding checkbox, further includes the character string "Transmit the preceding command via the print port as a wireless port" and the corresponding checkbox, and further includes the character string "Determine whether to transmit the preceding command, depending on a measured communication speed for communication with the printer" and the corresponding radio button. Nonetheless, the port setting information input screen may not necessarily include all of the above-exemplified objects. The port setting information input screen may include some of the above-exemplified objects.

Associations between elements exemplified in the aforementioned illustrative embodiment and elements according to aspects of the present disclosure will be exemplified below. The memory 62 may be an example of a "non-transitory computer-readable medium" according to aspects of the present disclosure, and may be an example of a "memory" according to aspects of the present disclosure. The driver program 66 may be an example of a "computer-readable instructions" stored in the "non-transitory computer-readable medium" according to aspects of the present disclosure, and may be an example of a "processor-executable instructions" stored in the "memory" according to aspects of the present disclosure. The CPU 61 may be an example of a "processor" according to aspects of the present disclosure. The communication I/F 55 may be an example of a "communication interface" according to aspects of the present disclosure. The display 53 may be an example of a "display" according to aspects of the present disclosure. The port setting information input screen (see FIG. 9) may be an example of a "setting screen" according to aspects of the present disclosure. The PC 50 may be an example of an "information processing device" according to aspects of the present disclosure.

What is claimed is:

1. A non-transitory computer-readable medium storing computer-readable instructions that are executable by a processor of an information processing device comprising a communication interface, the instructions being configured to, when executed by the processor, cause the information processing device to:
receive print instruction information from an OS for the processor, the print instruction information including a print instruction, the print instruction representing that a user instruction to cause a printer to perform a printing operation has been input;
in response to receiving the print instruction information, determine whether to transmit preparing instruction information to cause the printer to perform a pre-printing operation, based on at least one of information included in the received print instruction information and reference communication time required for communication with the printer, the pre-printing operation comprising preparing for the printing operation in advance of performing the printing operation, the preparing instruction information being information to be transmitted prior to instructing the printer to perform the printing operation;
in response to determining to transmit the preparing instruction information, transmit the preparing instruction information to the printer via the communication interface;
in response to transmitting the preparing instruction information, generate print data based on user-designated content data; and
transmit print execution information to the printer via the communication interface, the print execution information instructing the printer to perform the printing operation based on the generated print data;
wherein the print instruction information includes specific information representing whether the printer is a shared printer configured to receive the print data via another information processing device different from the information processing device, and
wherein the computer-readable instructions are further configured to, when executed by the processor, cause the information processing device to:
determine whether the printer is the shared printer, based on the specific information;
in response to determining that the printer is not the shared printer, determine to transmit the preparing instruction information to the printer; and
in response to determining that the printer is the shared printer, determine not to transmit the preparing instruction information.

2. The non-transitory computer-readable medium according to claim 1,
wherein the computer-readable instructions are further configured to, when executed by the processor, cause the information processing device to:
transmit first request information to the printer, the first request information requesting the printer to transmit information on a first time, the first time being a period of time from when the printer performs the pre-printing operation and then makes a transition from a standby state into an active state where the printer is allowed to perform the printing operation until when the printer is brought back into the standby state;
receive the information on the first time from the printer;
in response to receiving the print instruction information, generate a specific command and provide the generated specific command to the OS, the specific command instructing the OS to transmit second request information to the printer and measure the reference communication time, the second request information requesting the printer to return a response to the second request information, the reference communication time being a period of time from when the second request information is transmitted to the printer until when the response is received from the printer;
after providing the specific command, acquire information on the reference communication time from the OS;
determine whether a second time depending on the reference communication time is less than the first time;
in response to determining that the second time depending on the reference communication time is less than the first time, determine to transmit the preparing instruction information to the printer; and
in response to determining that the second time depending on the reference communication time is equal to or more than the first time, determine not to transmit the preparing instruction information to the printer.

3. The non-transitory computer-readable medium according to claim 1,
wherein the print instruction information includes:
first information representing whether the printer is a shared printer configured to receive the print data via another information processing device different from the information processing device; and
second information representing how the information processing device is connected with the printer, and
wherein the computer-readable instructions are further configured to, when executed by the processor, cause the information processing device to:
determine whether the printer is the shared printer, based on the first information;
in response to determining that the printer is the shared printer, determine whether the information processing device is locally connected with the printer or connected therewith via a network, based on the second information;

in response to determining that the information processing device is locally connected with the printer and determining to transmit the preparing instruction information to the printer, transmit the preparing instruction information to the printer via the OS; and in response to determining that the information processing device is connected with the printer via the network and determining to transmit the preparing instruction information to the printer, generate transmission information including the preparing instruction information and a transmission address of the printer, and transmit the generated transmission information to the printer via the communication interface.

4. The non-transitory computer-readable medium according to claim 1, wherein the information processing device further comprises a display, and wherein the computer-readable instructions are further configured to, when executed by the processor, cause the information processing device to:

control the display to display a setting screen, the setting screen including at least one of:
a first object configured to accept a setting as to whether to transmit the preparing instruction information via a USB connection between the information processing device and the printer;
a second object configured to accept a setting as to whether to transmit the preparing instruction information via a wired LAN connection between the information processing device and the printer; and
a third object configured to accept a setting as to whether to transmit the preparing instruction information via a wireless LAN connection between the information processing device and the printer; and determine whether to transmit the preparing instruction information to the printer, based on a user setting accepted via the setting screen including at least one of the first to third objects.

5. An information processing device comprising:
a communication interface; and
a controller configured to perform a control process comprising:
receiving print instruction information from an OS for the controller, the print instruction information including a print instruction, the print instruction representing that a user instruction to cause a printer to perform a printing operation has been input;
in response to receiving the print instruction information, determining whether to transmit preparing instruction information to cause the printer to perform a pre-printing operation, based on at least one of information included in the received print instruction information and reference communication time required for communication with the printer, the pre-printing operation including preparing for the printing operation in advance of performing the printing operation, the preparing instruction information being information to be transmitted prior to instructing the printer to perform the printing operation;
in response to determining to transmit the preparing instruction information, transmitting the preparing instruction information to the printer via the communication interface;
in response to transmitting the preparing instruction information, generating print data based on user-designated content data; and
transmitting print execution information to the printer via the communication interface, the print execution information instructing the printer to perform the printing operation based on the generated print data;

wherein the print instruction information includes specific information representing whether the printer is a shared printer configured to receive the print data via another information processing device different from the information processing device, and wherein the controller is further configured to perform:
determining whether the printer is the shared printer, based on the specific information;
in response to determining that the printer is not the shared printer, determining to transmit the preparing instruction information to the printer; and
in response to determining that the printer is the shared printer, determining not to transmit the preparing instruction information.

6. The information processing device according to claim 5, wherein the controller comprises:
a processor; and
a memory storing processor-executable instructions configured to, when executed by the processor, cause the processor to perform the control process.

7. A method implementable on a processor of an information processing device comprising a communication interface, the method comprising:
receiving print instruction information from an OS for the processor, the print instruction information including a print instruction, the print instruction representing that a user instruction to cause a printer to perform a printing operation has been input;
in response to receiving the print instruction information, determining whether to transmit preparing instruction information to cause the printer to perform a pre-printing operation, based on at least one of information included in the received print instruction information and reference communication time required for communication with the printer, the pre-printing operation including preparing for the printing operation in advance of performing the printing operation, the preparing instruction information being information to be transmitted prior to instructing the printer to perform the printing operation;
in response to determining to transmit the preparing instruction information, transmitting the preparing instruction information to the printer via the communication interface;
in response to transmitting the preparing instruction information, generating print data based on user-designated content data; and
transmitting print execution information to the printer via the communication interface, the print execution information instructing the printer to perform the printing operation based on the generated print data;

wherein the print instruction information includes specific information representing whether the printer is a shared printer configured to receive the print data via another information processing device different from the information processing device, and wherein the method further comprises:
determining whether the printer is the shared printer, based on the specific information;

in response to determining that the printer is not the shared printer, determining to transmit the preparing instruction information to the printer; and in response to determining that the printer is the shared printer, determining not to transmit the preparing instruction information.

8. A non-transitory computer-readable medium storing computer-readable instructions that are executable by a processor of an information processing device comprising a communication interface, the instructions being configured to, when executed by the processor, cause the information processing device to:

receive print instruction information from an OS for the processor, the print instruction information including a print instruction, the print instruction representing that a user instruction to cause a printer to perform a printing operation has been input;

in response to receiving the print instruction information, determine whether to transmit preparing instruction information to cause the printer to perform a pre-printing operation, based on at least one of information included in the received print instruction information and reference communication time required for communication with the printer, the pre-printing operation comprising preparing for the printing operation in advance of performing the printing operation, the preparing instruction information being information to be transmitted prior to instructing the printer to perform the printing operation;

in response to determining to transmit the preparing instruction information, transmit the preparing instruction information to the printer via the communication interface;

in response to transmitting the preparing instruction information, generate print data based on user-designated content data; and transmit print execution information to the printer via the communication interface, the print execution information instructing the printer to perform the printing operation based on the generated print data;

wherein the print instruction information includes particular information representing how the information processing device is connected with the printer, and wherein the computer-readable instructions are further configured to, when executed by the processor, cause the information processing device to:

determine whether the information processing device is locally connected with the printer or connected therewith via a network, based on the particular information; and in response to determining that the information processing device is locally connected with the printer, determine to transmit the preparing instruction information to the printer.

9. The non-transitory computer-readable medium according to claim 8, wherein the computer-readable instructions are further configured to, when executed by the processor, cause the information processing device to:

in response to determining that the information processing device is connected with the printer via the network, determine whether the network connection between the information processing device and the printer is a wired connection or a wireless connection, based on the particular information;

in response to determining that the network connection between the information processing device and the printer is the wired connection, determine to transmit the preparing instruction information to the printer;

in response to determining that the network connection between the information processing device and the printer is the wireless connection, determine not to transmit the preparing instruction information.

10. An information processing device comprising:

a communication interface; and a controller configured to perform a control process comprising:

receiving print instruction information from an OS for the controller, the print instruction information including a print instruction, the print instruction representing that a user instruction to cause a printer to perform a printing operation has been input;

in response to receiving the print instruction information, determining whether to transmit preparing instruction information to cause the printer to perform a pre-printing operation, based on at least one of information included in the received print instruction information and reference communication time required for communication with the printer, the pre-printing operation including preparing for the printing operation in advance of performing the printing operation, the preparing instruction information being information to be transmitted prior to instructing the printer to perform the printing operation;

in response to determining to transmit the preparing instruction information, transmitting the preparing instruction information to the printer via the communication interface;

in response to transmitting the preparing instruction information, generating print data based on user-designated content data; and transmitting print execution information to the printer via the communication interface, the print execution information instructing the printer to perform the printing operation based on the generated print data;

wherein the print instruction information includes particular information representing how the information processing device is connected with the printer, and wherein the controller is further configured to perform:

determining whether the information processing device is locally connected with the printer or connected therewith via a network, based on the particular information; and in response to determining that the information processing device is locally connected with the printer, determining to transmit the preparing instruction information to the printer.

11. A method implementable on a processor of an information processing device comprising a communication interface, the method comprising:

receiving print instruction information from an OS for the processor, the print instruction information including a print instruction, the print instruction representing that a user instruction to cause a printer to perform a printing operation has been input;

in response to receiving the print instruction information, determining whether to transmit preparing instruction information to cause the printer to perform a pre-printing operation, based on at least one of information included in the received print instruction information and reference communication time required for communication with the printer, the pre-printing operation including preparing for the printing operation in advance of performing the printing operation, the preparing instruction information being information to be transmitted prior to instructing the printer to perform the printing operation;

in response to determining to transmit the preparing instruction information, transmitting the preparing instruction information to the printer via the communication interface;

in response to transmitting the preparing instruction information, generating print data based on user-designated content data; and transmitting print execution information to the printer via the communication interface, the print execution information instructing the printer to perform the printing operation based on the generated print data;

wherein the print instruction information includes particular information representing how the information processing device is connected with the printer, and wherein the method further comprises:
  determining whether the information processing device is locally connected with the printer or connected therewith via a network, based on the particular information; and
  in response to determining that the information processing device is locally connected with the printer, determining to transmit the preparing instruction information to the printer.

* * * * *